United States Patent [19]
Yano

[11] Patent Number: 5,820,060
[45] Date of Patent: Oct. 13, 1998

[54] SEAT BELT RETRACTOR

[75] Inventor: Hideaki Yano, Shiga, Japan

[73] Assignee: Takata Corporation, Tokyo, Japan

[21] Appl. No.: 871,440

[22] Filed: Jun. 9, 1997

[51] Int. Cl.[6] .................................................. B60R 22/405
[52] U.S. Cl. ........................................................ 242/384.4
[58] Field of Search .......................... 242/384.4; 280/806;
297/478, 480

[56] References Cited

U.S. PATENT DOCUMENTS

| 3,938,754 | 2/1976 | Stephenson et al. | 242/384.4 |
| 4,077,584 | 3/1978 | Lafont | 242/384.4 |
| 4,273,210 | 6/1981 | Nitzbon . | |
| 4,524,924 | 6/1985 | Proctor | 242/384.4 |
| 4,978,087 | 12/1990 | Tauber | 242/384.4 |
| 5,289,986 | 3/1994 | Hoshihara | 242/384.4 |
| 5,495,994 | 3/1996 | Rumpf et al. | 242/384.4 |

FOREIGN PATENT DOCUMENTS

| 3-1210158 | 12/1991 | Japan . |
| 1 525523 | 9/1978 | United Kingdom . |
| 2 235 124 | 2/1991 | United Kingdom . |

*Primary Examiner*—John M. Jillions
*Attorney, Agent, or Firm*—Foley & Lardner

[57] ABSTRACT

A seat belt retractor incorporated in a seat back that does not create noise, even with the vibration of a vehicle. A reel is supported by a frame, and reel rotation is prevented by a locking mechanism. In the locking mechanism, rotation of a gear wheel is prevented by an acceleration sensor, and a trigger is pivoted through a clutch wheel to engage a tooth portion with teeth on a lock ring, thereby stopping rotation of an intermediate wheel. Ratchets are supported by a ratchet wheel associated with the intermediate wheel. Since the ratchet wheel rotates even after stopping rotation of the intermediate wheel, the ratchets move outward whereby a stopper is pressed down. This cancels the engagement between a rack on a sensor holding portion and a rack of the stopper.

16 Claims, 25 Drawing Sheets

SEAT BELT RETRACTOR

BACKGROUND OF THE INVENTION

The present invention relates to a retractor for a seat belt device installed in a vehicle, more particularly, to a seat belt retractor suitable for being incorporated in a seat back of a seat. Incorporating a seat belt retractor in a seat back provides various advantages such as it is not necessary to mount a seat belt anchoring member on a center pillar of the vehicle body.

A typical seat belt retractor comprises a locking mechanism for locking a reel when a vehicle accelerates more than a predetermined value. When the typical seat belt retractor is incorporated in the seat back, the typical seat belt retractor is tilted according to the tilt of the seat back, causing the locking mechanism of the typical seat belt retractor to lock. Therefore, in this case, the typical seat belt retractor needs a mechanism for preventing the seat belt retractor from becoming locked due to seat back tilt. Europe Patent No. 351,551 discloses a seat belt retractor including such a mechanism.

FIG. 25 is a structural view of the seat belt retractor of the Europe Patent, which is provided with an activating mechanism 204 having a gear wheel 202 to lock a reel rotatably supported by a frame 200. The activating mechanism 204 constitutes one part of a locking mechanism (not shown).

The gear wheel 202 has teeth 206 facing an acceleration sensor 208. The acceleration sensor 208 comprises a weight 210 allowed to tilt, a casing 212 holding the weight 210, a lever 214 laid on the weight 210, and an actuator 215. The pivot end of the lever 214 is supported by the casing 212. The pivot end of the actuator 215 is rotatably supported by the frame 200. As the weight 210 tilts, the lever 214 is pushed up so that a tip 215a of the actuator 215 is also pushed up, such that the tip 215a of the actuator 215 engages one of the teeth 206. This actuates the activating mechanism 204 with the result that the locking mechanism (not shown) is actuated.

The casing 212 is pivotally supported by a shaft 218. The casing 212 is provided with a weight 220 for keeping the casing 212 oriented vertically. The weight 220 is fan shaped and is provided with a rack 222 extending along the periphery thereof. A contact 224 is pressed against the rack 222 by a torsion spring 226. The contact 224 can be rotated around a bar 228.

As the seat back is tilted, the weight 220 pivots around the shaft 218 so as to maintain the vertical orientation of the casing 212. The contact 224 engages the rack 222 to damp rocking movement of the weight 220.

In the conventional seat belt retractor as mentioned above, when the weight 220 reacts to a large acceleration, the contact 224 and the rack 222 slip with respect to each other to allow the movement of the weight 220. In the conventional seat belt retractor, slippage between the contact 224 and the rack 222 creates noise. Since the conventional seat belt retractor is incorporated in the seat back near an occupant's ear, slippage causes an unpleasant noise at the occupant's ear.

SUMMARY OF THE INVENTION

It is an object of the present invention to provide a seat belt retractor which does not cause such noise.

A seat belt retractor according to the present invention comprises a reel for winding up a seat belt, and a locking mechanism for preventing the rotation of the reel when acceleration over a predetermined value is exerted. The locking mechanism comprises: a mass which tilts according to the acceleration to activate the locking mechanism; a casing capable of pivoting, the casing holding the mass; and a casing holder engaging the casing to prevent the pivotal movement of the casing, and wherein the casing holder releases the casing when the locking mechanism is activated to prevent rotation of the reel.

In the seat belt retractor according to the present invention, the casing may pivot freely when an acceleration activating the locking mechanism is exerted. Normally, the casing does not pivot, so noise is not created.

The casing holder preferably comprises: a first engaging member disposed on the opposite side of the axis of the reel through the casing; a second engaging member disposed on the casing and capable of engaging the first engaging member; and an engagement canceler for moving the first engaging member apart from the second engaging member to cancel the engagement between the first engaging member and the second engaging member when the locking mechanism is activated.

The engagement canceler preferably comprises: a wheel member capable of changing the diameter thereof and disposed coaxially with the reel; and a facing member facing the outer periphery of the wheel member, wherein the facing member is connected to the first engaging member, the facing member is pressed and moves radially with respect to the axis of the reel when the wheel member changes the diameter thereof so that the first engaging member moves apart from the second engaging, member to cancel the engagement therebetween.

The wheel member preferably comprises: a ratchet wheel rotating integrally with the reel, a plurality of ratchets rotatably supported by pivot shafts around the outer periphery of the ratchet wheel in such a manner that the ratchets are capable of projecting from the outer periphery of the ratchet wheel. The pivot shafts projects perpendicularly to a face of the ratchet wheel.

The ratchet wheel preferably acts on a facing member disposed near the periphery of the ratchet wheel. The facing member is pressed by the ratchets in such a direction as to move with respect to the axis of the ratchet wheel.

It is preferable that the facing member is a plate extending in an arc shape along the outer periphery of the ratchet wheel and is biased toward the axis of the ratchet wheel by a biasing member.

It is preferable that the first engaging member comprises: a concave arcuate face extending along a part of a circle centered on the axis of the ratchet wheel; and a first rack formed on the concave face, while the second engaging member comprises a second rack engaging the first rack.

It is preferable that the casing is capable of pivoting around the axis of the ratchet wheel and is supported by a member having an arm portion extending in the radial direction of the ratchet wheel whereby the casing is capable of moving to a position vertically below the axis of the ratchet wheel when the engagement between the racks is canceled.

It is preferable that the reel is rotatably supported by the frame and the casing is pivotally supported on the frame.

Further, the casing is preferably provided with a dead mass to keep the casing in a vertical orientation.

It is also preferable that the second engaging member is a rack formed on a bottom outer face of the dead mass, the bottom outer face being curved in an arc shape, and wherein the first engaging member is a protrusion for engaging the rack, the protrusion being disposed to confront the rack and connected to the plate.

According to the present invention, it is preferable that the seat belt retractor further comprises an intermediate wheel confronting the ratchet wheel.

The intermediate wheel rotates with the ratchet wheel without any restriction by the acceleration sensor when acceleration detected by the acceleration sensor is less than a predetermined value. The intermediate wheel has ratchet guide pins around the periphery thereof projecting from a face confronting the ratchet wheel, the ratchet guide pins being in contact with the ratchets.

Rotation of the intermediate wheel is stopped and the ratchets are projected outward by the ratchet guide pins when the acceleration sensor detects acceleration over the predetermined value.

BRIEF DESCRIPTION OF THE DRAWINGS

FIGS. 16A through 16C are explanation views of the operation of the seat belt retractor, wherein FIG. 16A is an explanation view of the operation of the ratchets, FIG. 16B is an explanation view showing the relation between the intermediate wheel and the ratchet wheel, and FIG. 16C is an explanation view showing the operation of the trigger.

FIGS. 17A through 17C are explanation views of the operation of the seat belt retractor, wherein FIG. 17A is an explanation view of the operation of the ratchets, FIG. 17B is an explanation view showing the relation between the intermediate wheel and the ratchet wheel, and FIG. 17C is an explanation view showing the operation of the trigger.

FIGS. 18A through 18C are explanation views of the operation of the seat belt retractor, wherein FIG. 18A is an explanation view of the operation of the ratchets, FIG. 18B is an explanation view showing the relation between the intermediate wheel and the ratchet wheel, and FIG. 18C is an explanation view showing the operation of the trigger.

FIGS. 19A through 19C are explanation views of the operation of the seat belt retractor wherein FIG. 19A is an explanation view of the operation of the ratchets, FIG. 19B is an explanation view showing the relation between the intermediate wheel and the ratchet wheel, and FIG. 19C is an explanation view showing the operation of the trigger.

FIGS. 20A through 20C are explanation views of the operation of the seat belt retractor wherein FIG. 20A is an explanation view of the operation of the ratchets, FIG. 20B is an explanation view showing the relation between the intermediate wheel and the ratchet wheel, and FIG. 20C is an explanation view showing the operation of the trigger.

FIGS. 22A through D are explanation views of the operation of the seat belt retractor according to the embodiment of FIG. 21, wherein FIG. 22A shows the state where the pivotal movement of a dead mass 140 is allowed, and FIGS. 22B, 22C, and 22D each show the state where a rack of the dead mass 140 and a protrusion are engaged with each other.

DETAILED DESCRIPTION OF PREFERRED EMBODIMENTS

Hereinafter, preferred embodiments will be described with reference to attached drawings. FIGS. 1 through 20 show the structure of a seat belt retractor according to a preferred embodiment.

Figure 1:
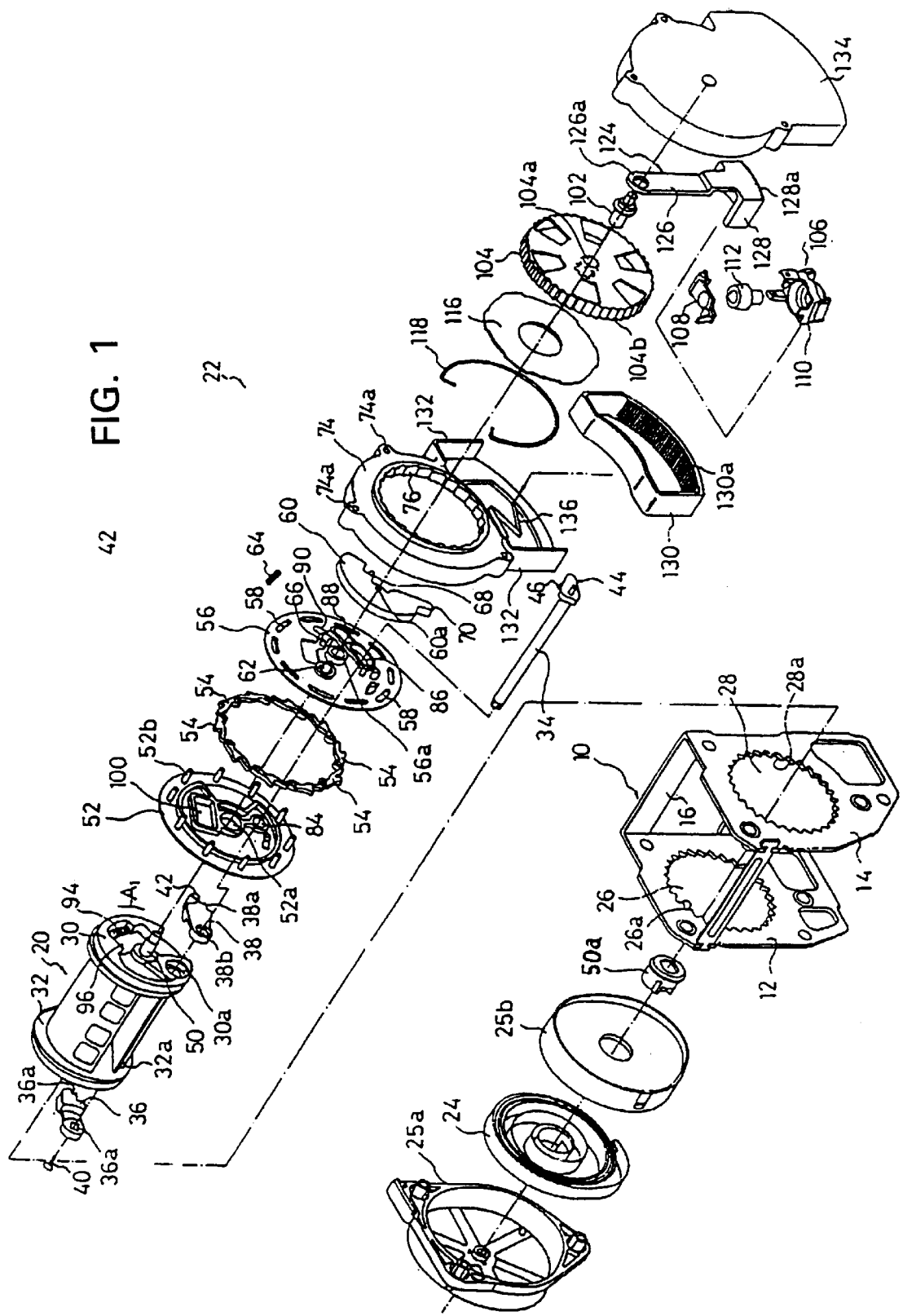
FIG. 1 is an exploded perspective view of a seat belt retractor according to an embodiment of the present invention.

As shown in FIG. 1, a frame 10 has a pair of side walls 12, 14 extending parallel to each other, and a back plate 16 for connecting the side walls 12 and 14. The frame 10 is provided with a reel 20 for winding up a seat belt 18 and a locking mechanism 22 for locking the winding of the reel 20 at an emergency.

The side walls 12, 14 are provided with holes 26, 28 coaxially formed with each other, and on which inner circumferences are provided teeth 26a, 28a, respectively.

The reel 20 has a shaft, projecting from the center of the left-side surface in FIG. 1, to which the central end of a return spring 24 is connected through a bush shaft 50a. The other end of the return spring 24 is fixed to the side wall 12 through covers 25a, 25b. As the seat belt 18 is withdrawn, the reel 20 rotates in such a direction that the return spring 24 is compressed. When the seat belt 18 is released, the reel 20 rotates by the biasing force of the return spring 24 so as to automatically wind up the seat belt 18 onto the reel 20. It should be noted that the reel 20 rotates in a direction of the arrow $A_1$ when the seat belt 18 is withdrawn.

The reel 20 has flanges 30, 32 at both sides, which are provided with holes 30a, 32a, respectively, through which a pawl pin 34 is inserted.

Figure 2:
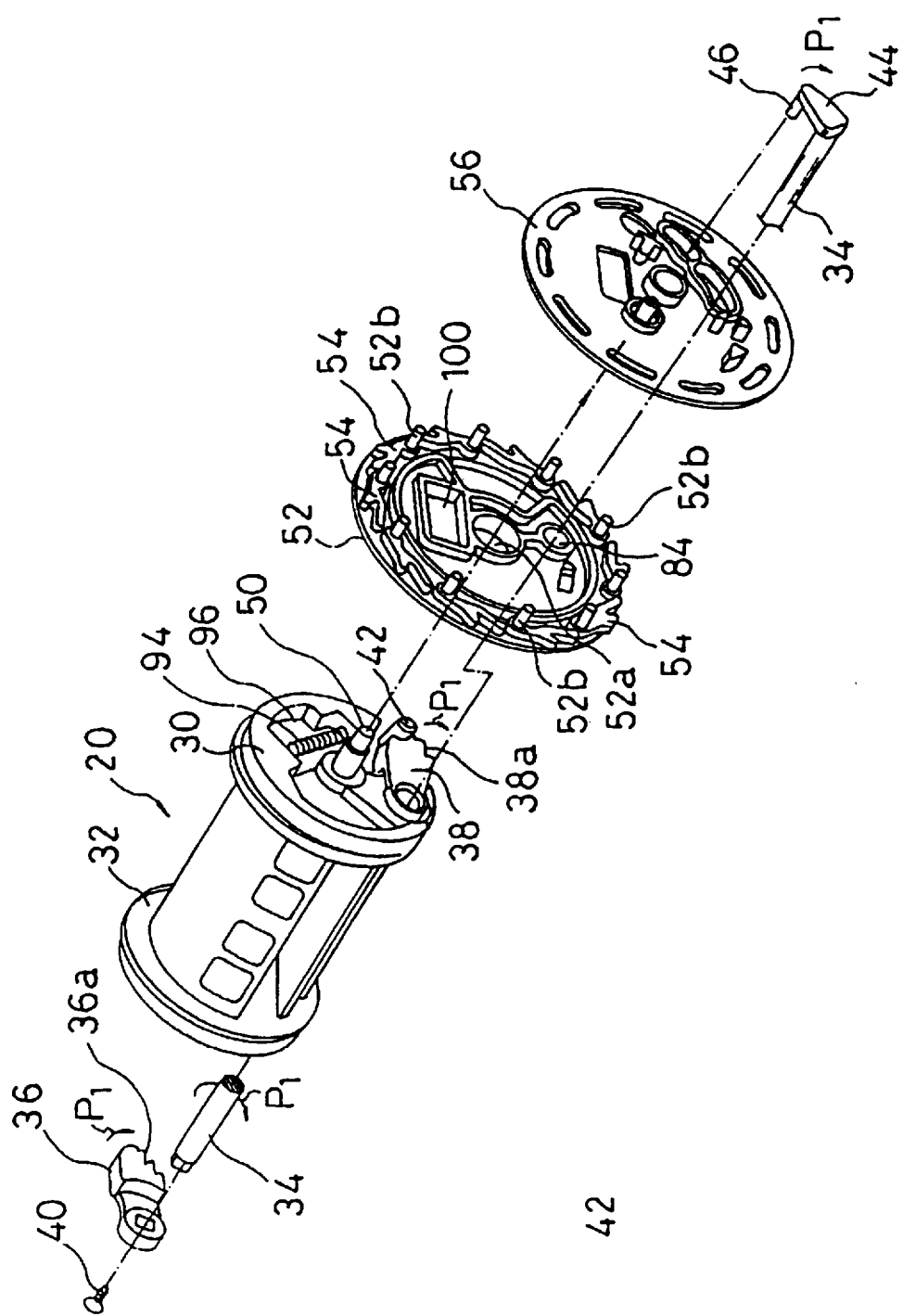
FIG. 2 is an exploded perspective view showing the relation between a reel, a ratchet wheel and a intermediate wheel.
Figure 3:
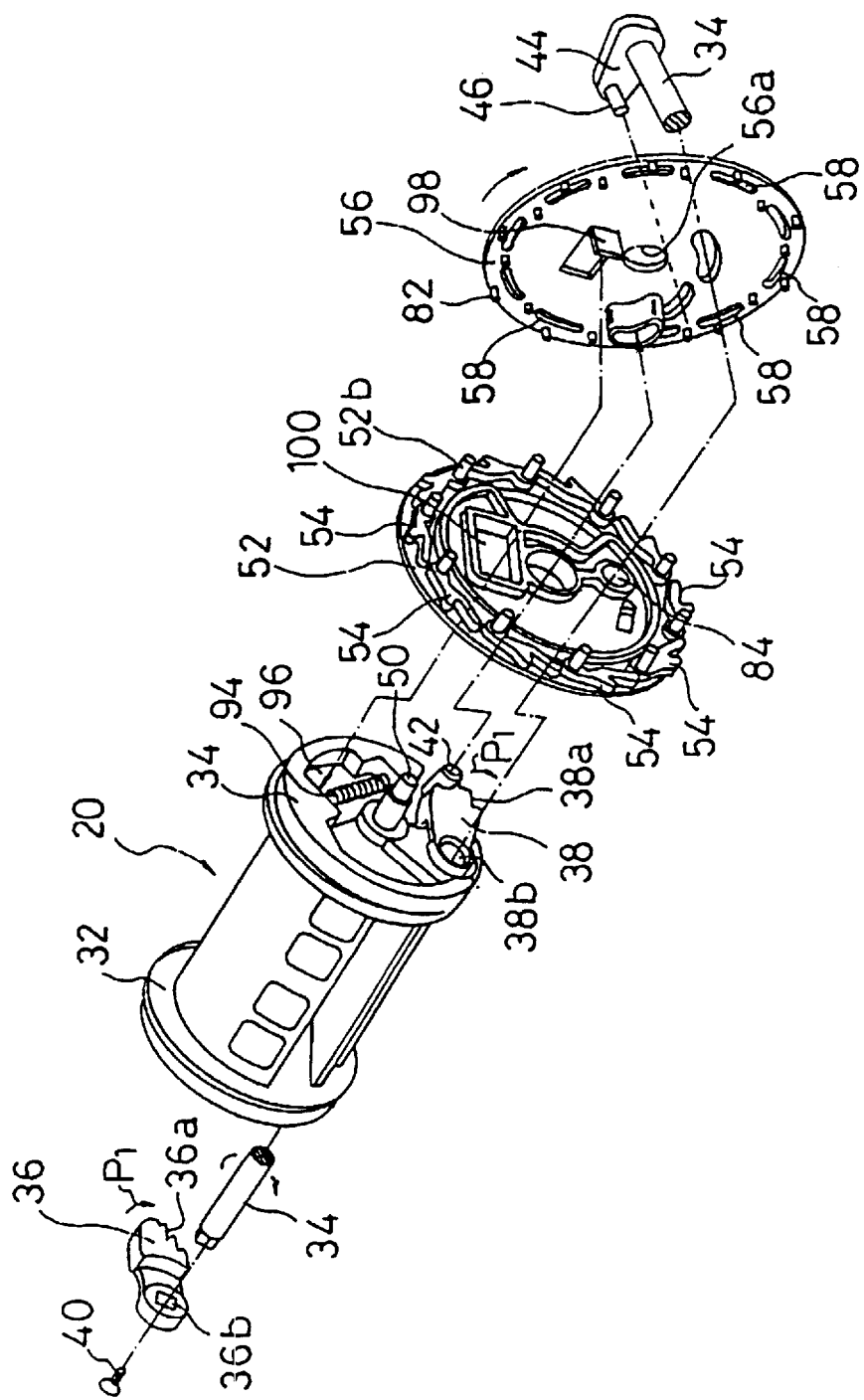
FIG. 3 is an exploded perspective view showing the relation between the reel, the ratchet wheel and the intermediate wheel.

The pawl pin 34 has a rectangular end on the left side in FIG. 2. As also shown in FIGS. 2 and 3, the left end of the pawl pin 34 is inserted into a rectangular hole 36b of a left pawl 36 and fixed by a screw 40.

A right pawl 38 has a round hole 38b at the rear end side thereof, into which a right-side portion of the pawl pin 34 is rotatably inserted.

Both pawls 36, 38 are provided with teeth 36a, 38a, respectively, which engage the teeth 26a, 28a of the aforementioned frame 10 to prevent the rotation of the reel 20 in the direction Al allowing withdrawal of the belt. The right pawl 38 has a guide pin 42 projecting outwardly relative to the reel 20.

The pawl pin 34 is provided with an arm 44 extending perpendicularly to the longitudinal direction of the pawl pin at the right end in FIG. 1. The arm 44 is provided with an arm guide pin 46 projecting from the distal end thereof and extending parallel to the pawl pin 34.

The aforementioned locking mechanism 22 has a ratchet wheel 52 provided with a central hole 52a into which a shaft 50 projecting from the center of the right end face of the reel 20 is rotatably inserted as shown in FIGS. 2 through 7. The ratchet wheel 52 is provided with a plurality of pivot shafts 52b disposed circumferentially at equal intervals and projecting perpendicular to the face of the ratchet wheel 52. Ratchets 54 have holes 54a (FIG. 8) at the rear ends, respectively, into which respective pivot shafts 52b are inserted.

After placing the ratchets 54 on the pivot shafts 52b, a disk-like intermediate wheel 56 is disposed so as to sandwich the ratchets 54 with the ratchet wheel 52. The shaft 50 is received in a central hole 56a of the intermediate wheel 56. The intermediate wheel 56 is provided with circumferentially elongated holes 58 disposed around the periphery thereof, wherein the number of the elongated holes 58 is the same as the number of pivot shafts 52b so that the tips of the pivot shafts 52b are inserted into respective elongated holes 58.

Figure 9:
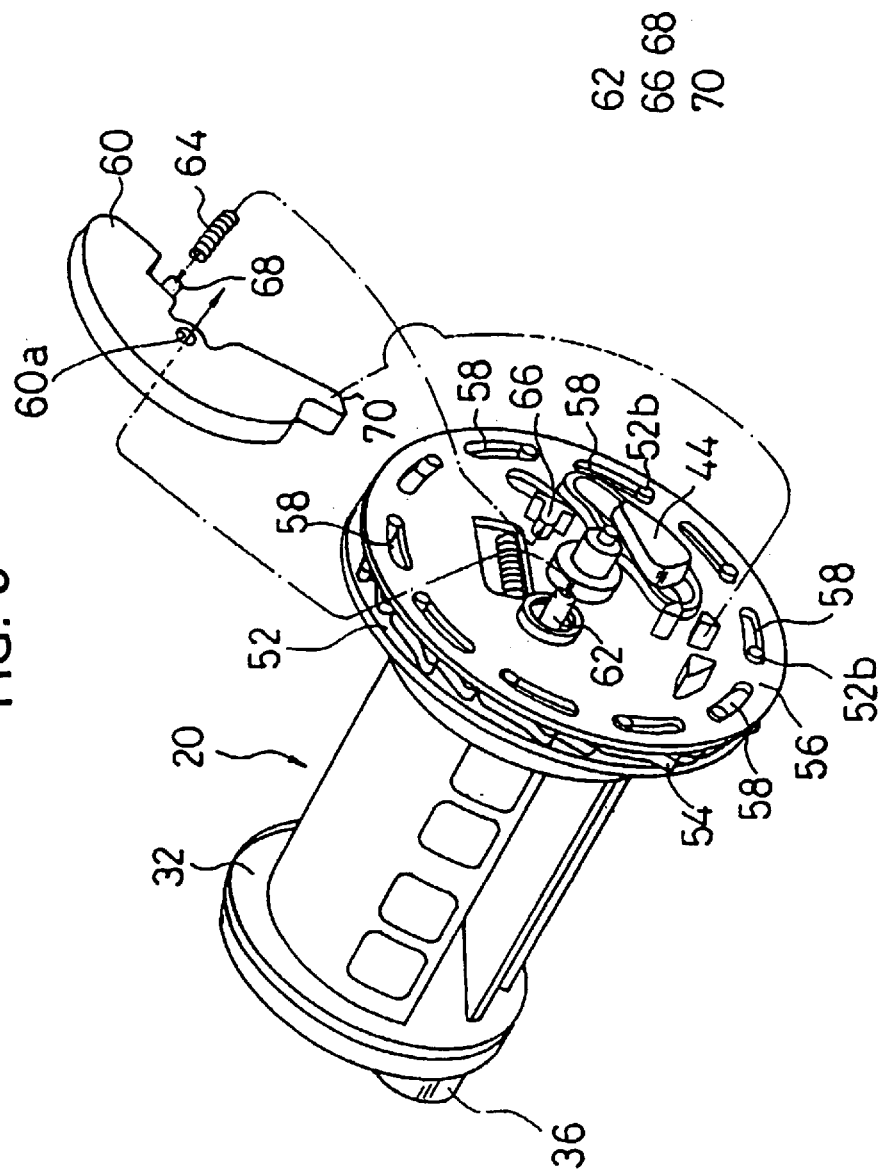
FIG. 9 is an exploded perspective view showing the relation between the intermediate wheel and the trigger.
Figure 10:
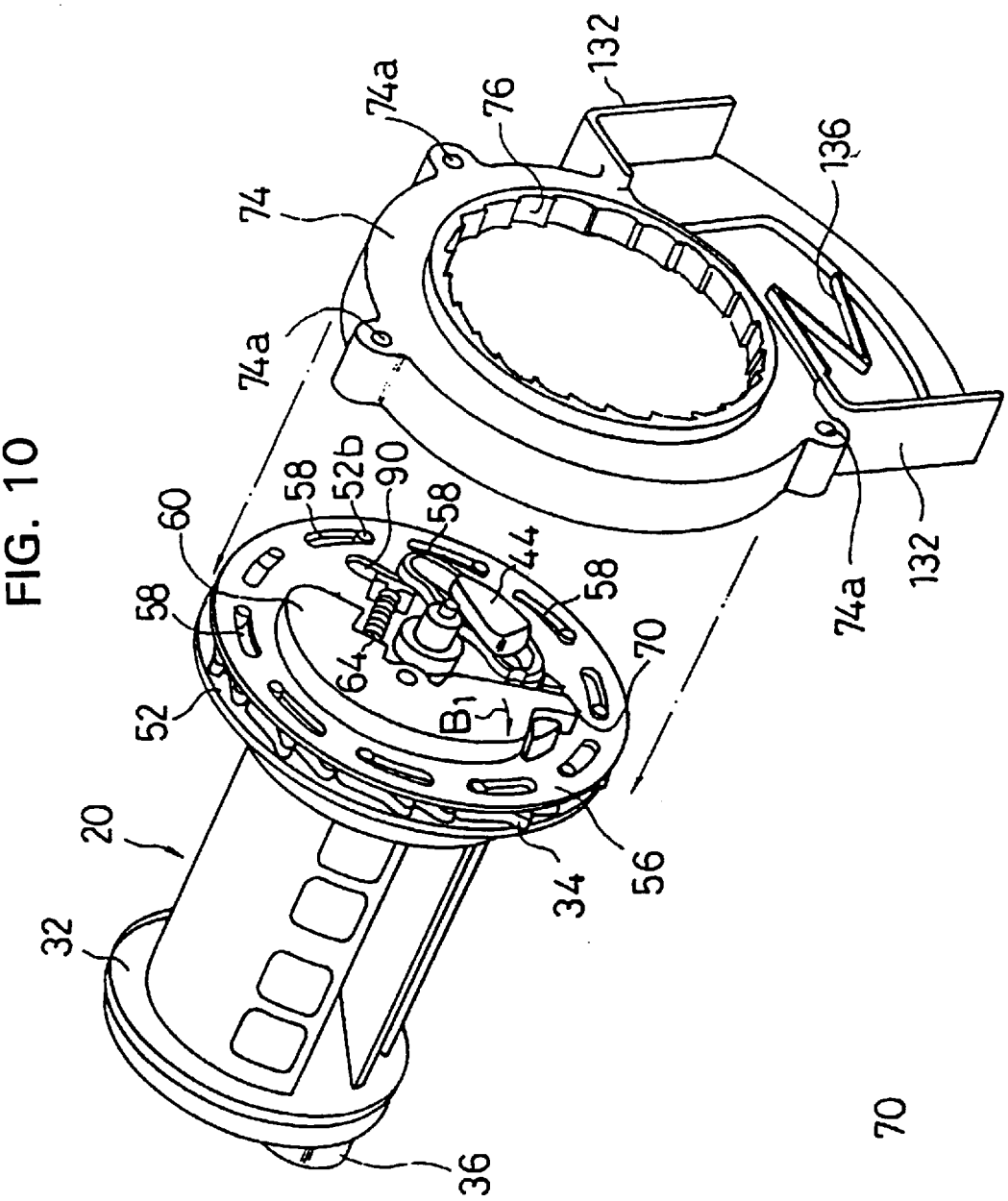
FIG. 10 is an exploded perspective view showing the relationship of a lock ring to the intermediate wheel.

The intermediate wheel 56 is provided with a convex shaft 62 for supporting a pivotal trigger 60 (FIG. 9, FIG. 10). The convex shaft 62 is inserted into a hole 60a of the arc-like trigger 60.

A compression coil spring 64 is disposed between the intermediate wheel 56 and the trigger 60. That is, the intermediate wheel 56 has a small projection 66 extending parallel to the face of the wheel 56 and the trigger 62 has a small projection 68 facing the small projection 66 so that the spring 64 is disposed between both projections 66, 68. The trigger 60 is provided with a tooth portion 70 at an end thereof opposite to the small projection 68 of the trigger 60 with respect to the hole 60a. The tooth portion 70 engages internal teeth 76 of a lock ring 74 so as to prevent rotation of the intermediate wheel 56. The compression coil spring 64 compresses the trigger 60 so that the tooth portion 70 is normally positioned apart from the internal teeth 76.

The lock ring 74 has a ring-like portion where the internal teeth 76 are formed on the inner periphery thereof. The lock ring 74 is installed to the side wall 14 of the frame 10 in such a manner that the ring-like portion surrounds the outer peripheries of the wheels 52, 56. The numeral 74a designates through holes into which bolts are inserted for mounting the lock ring 74 to the side wall 14.

As shown in FIGS. 4, 6, 7, and 8, the left side face, in FIG. 1, of the intermediate wheel 56 is provided with ratchet guide pins 80 for guiding the ratchets 54 to pivot outwardly and ratchet stopping pins 82 for preventing the ratchets from pivoting excessively outward and returning the ratchets 54 to the initial positions.

Figure 8A:
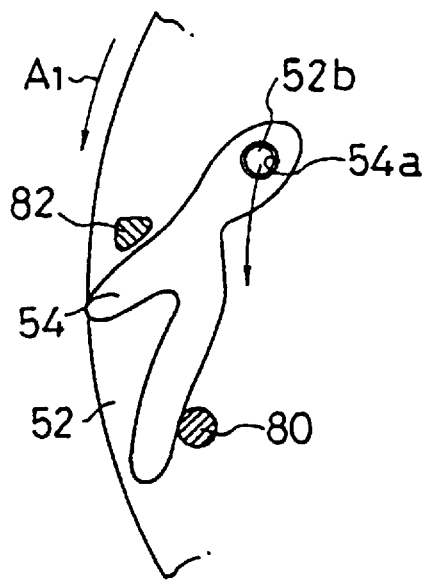
FIG. 8 is an enlarged perspective view of the main parts for explaining the operation of ratchets.

The ratchet guide pins 80 are in contact with inner surfaces of the ratchets 54, respectively, which are supported by the ratchet wheel 52. The ratchet stopping pins 82 are in contact with outer surfaces of the ratchets 54, respectively, as shown in FIG. 8A when there is no rotational phase shift between the ratchet wheel 52 and the intermediate wheel 56.

Figure 8B:
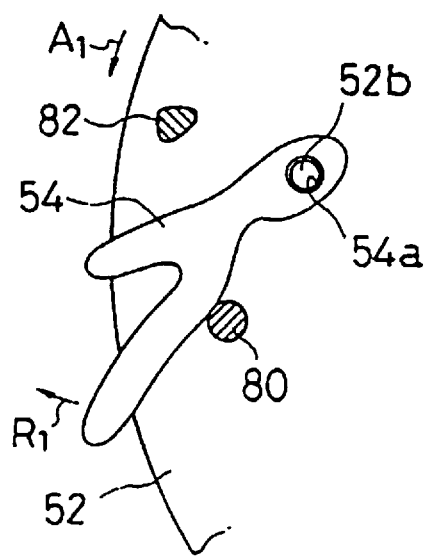

When there is no rotational phase shift between the ratchet wheel 52 and the intermediate wheel 56, the ratchets 54 are each sandwiched between pins 80 and 82 to prevent pivoting. When the ratchet wheel 52 rotates in the direction $A_1$ in FIG. 8 (in the belt withdrawing direction) with the rotation of the intermediate wheel 56 being prevented, rotational phase shifts are caused between the wheels 52 and 56. Therefore, the ratchets 54 are pushed up by the ratchet guide pins 80 to pivot outward as shown in FIG. 8B. Thus, a stopper 130 to be described later is pressed in such a direction as to move away from the shaft 50.

The ratchet wheel 52 and the intermediate wheel 56 are provided with holes 84 and 86, respectively, through which the pawl pin 34 is inserted. The hole 84 is a round hole having a diameter slightly larger than that of the pawl pin 34. The hole 86 of the intermediate wheel 56 is an elongated hole which is circumferentially elongated to allow the rotational phase shift between the wheels 52 and 56. The hole 86 is formed in such a manner as to extend along a part of a circle around the central hole 56a of the intermediate wheel 56 to have equal radii from the central hole 56a.

The intermediate wheel 56 is provided with an elongated hole 88 adjacent to the hole 86, and a further elongated hole 90 adjacent to the elongated hole 88. The arm guide pin 46 at the end of the arm 44 of the pawl pin 34 is inserted into the elongated hole 88. The guide pin 42 of the right pawl 38 is inserted into the elongated hole 90.

The elongated holes 88, 90 extend in an oblique direction between the circumferential direction and the radial direction. Specifically, the elongated hole 88 is formed in such a manner as to extend along a part of a circle around the central hole 56a of the intermediate wheel in a position near the hole 86 and to diverge away from the central hole 56a further from the hole 86. The elongated hole 90 is also formed obliquely in such a manner as to diverge away from the central hole 56a further from the hole 88.

Since the elongated hole 86 extends along a part of a circle centered around the central hole 56a and the elongated hole 88 is formed obliquely, rotational phase shift between the wheels 52 and 56 is caused by rotating the ratchet wheel 52 in the direction $A_1$ (the belt withdrawing direction) when the intermediate wheel 56 is stopped. At this point, the pawl pin 34 moves in the elongated hole 86 in the direction $A_1$. Movement of the pawl pin 34 causes the arm 44, with the arm guide pin 46 inserted into the elongated hole 88, to move away from the central hole 56a (the shaft 50) and causes the pawl pin 34 to rotate around the axis of the pawl pin 34 in the direction P₁ shown in FIGS. 2 through 6. Therefore, the left pawl 36 also rotates in the direction of P₁ with the pawl pin 34 so that the teeth 36a engages the teeth 26a on the frame 10.

Since the elongated hole 90 is formed obliquely in the same manner as the elongated hole 88, when rotational phase shift between the wheels 52 and 56 is caused by rotating the ratchet wheel 52 in the direction A₁ and the intermediate wheel 56 is stopped, the guide pin 42 of the right pawl 38 moves in the elongated hole 90 away from the elongated hole 88 and the guide pin 42 moves away from the shaft 50. Therefore, the right pawl 38 rotates around the pawl pin 34 axis in the direction P₁ so that the teeth 38a of the right pawl 38 engage the teeth 28a on the frame 10.

The right and left pawls 36, 38 engage the teeth 26a, 28a, thereby preventing the rotation of the reel 20 and preventing the withdrawal of the belt 18. As for right and left pawls 36 and 38, one of the pawls first engages one of the teeth 26a, 28a and then the other pawl engages the other one of the teeth 26a, 28a after a little delay.

The time delay between the engagements secures the engagements between the pawls 36, 38 and the teeth 26a, 28a of the frame 10.

Because the central hole 52a of the ratchet wheel 52 is fitted on the shaft 50, and the pawl pin 34 into the hole 84, the ratchet wheel 52 must rotate integrally with the reel 20 so that no rotational phase shift is possible between the ratchet wheel 52 and the reel 20.

As for the intermediate wheel 56, the shaft 50 is inserted into the central hole 56a of the intermediate wheel 56 so as to allow relative rotational phase shift with respect to the reel 20 and the ratchet wheel 52. Therefore, a coil spring 94 is disposed in a concave 96 of the flange 30 of the reel 20 to bias the intermediate wheel 56 in a direction to cancel the rotational phase shift.

Figure 4:
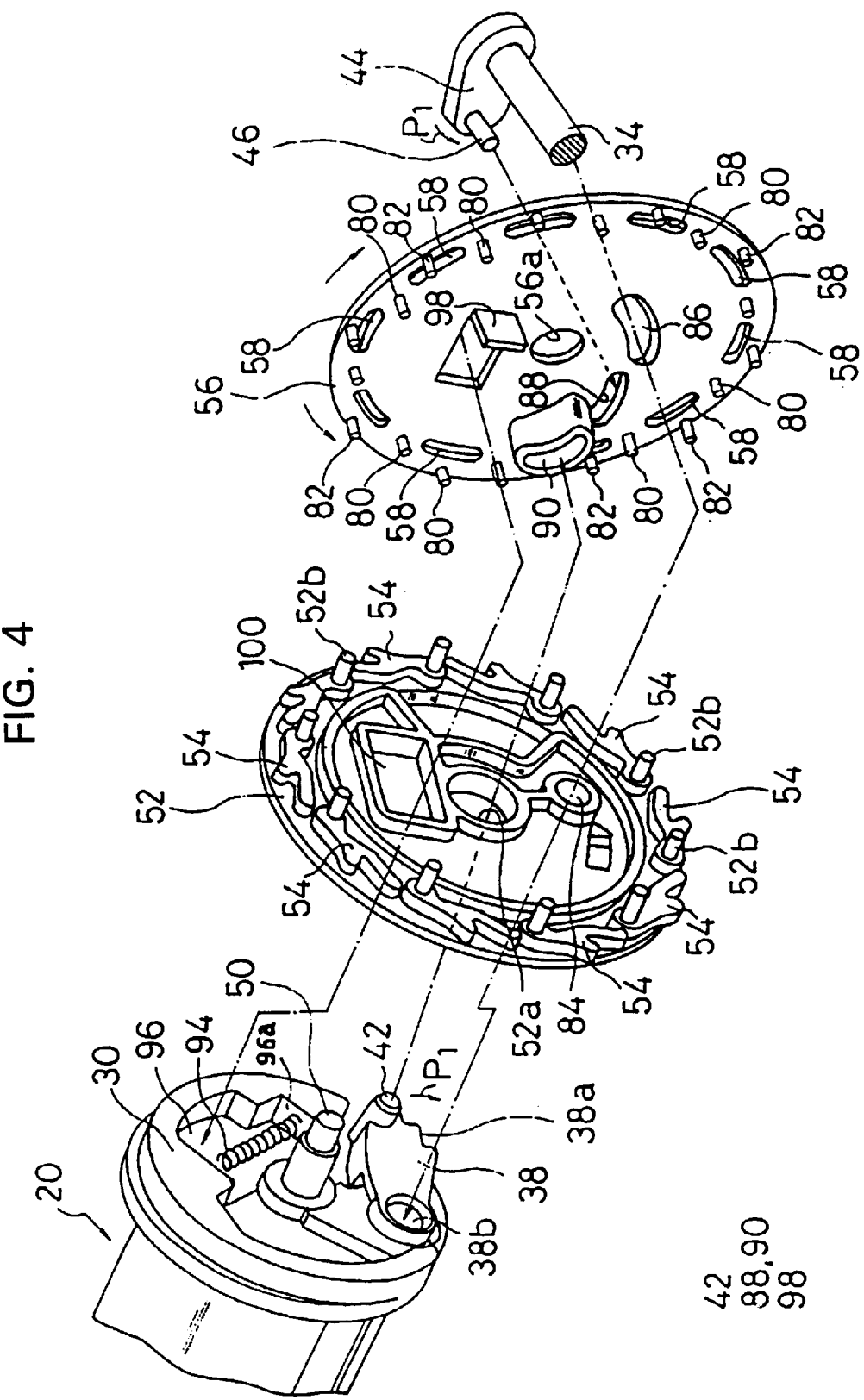
FIG. 4 is an exploded perspective view showing the relation between the reel, the ratchet wheel and the intermediate wheel.
Figure 5:
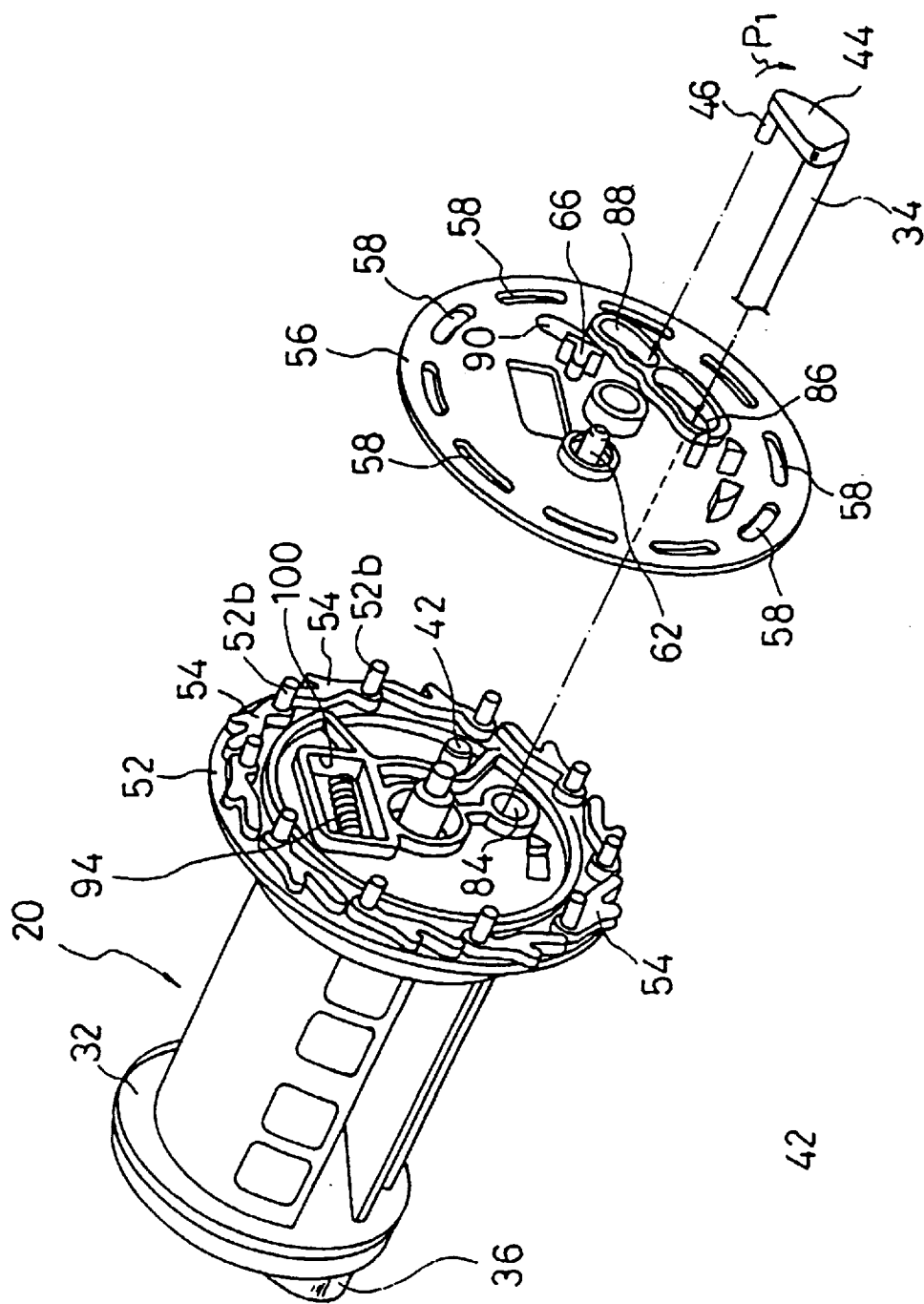
FIG. 5 is an exploded perspective view showing the relation between the reel, the ratchet wheel and the intermediate wheel.
Figure 6:
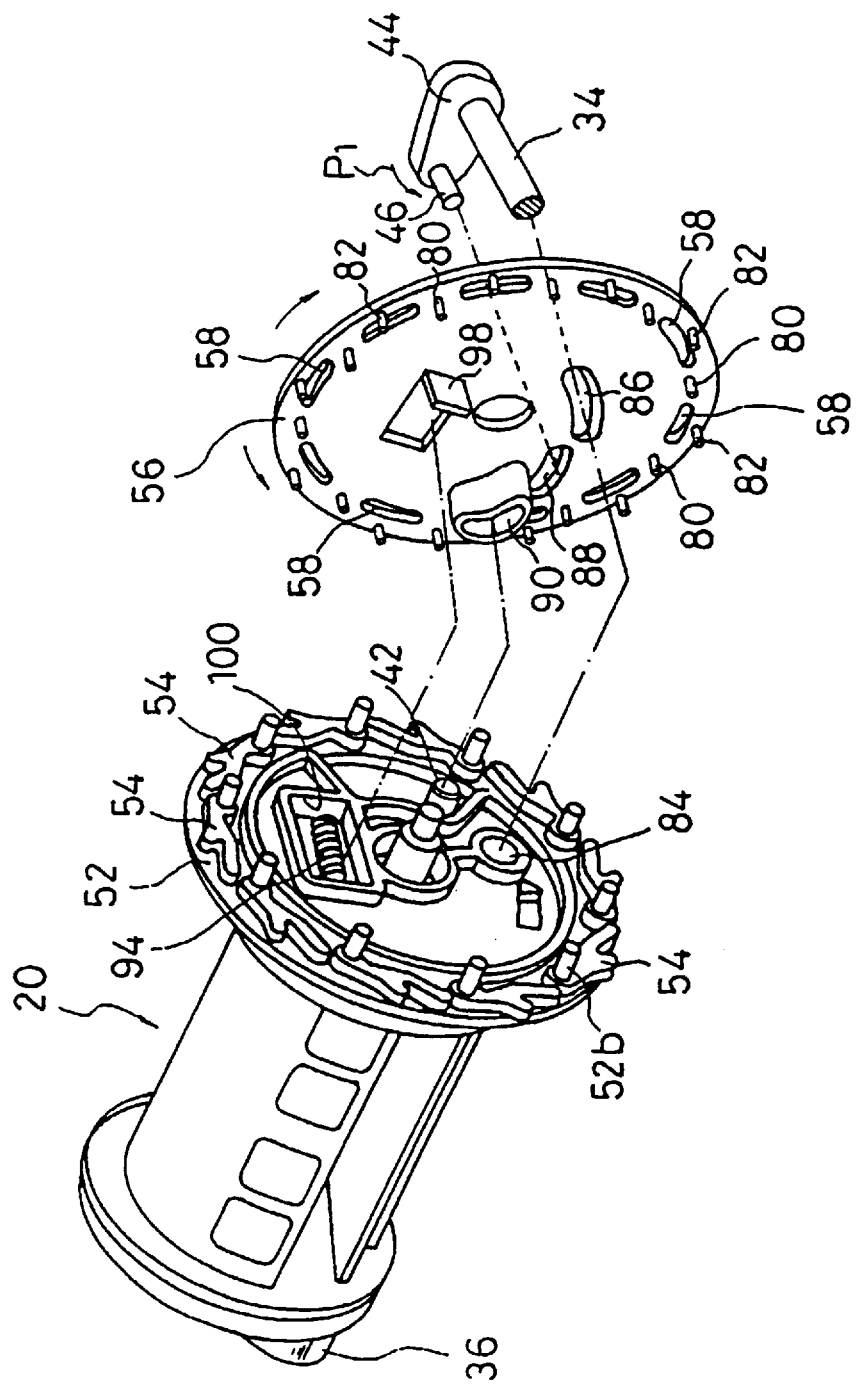
FIG. 6 is an exploded perspective view showing the relation between the reel, the ratchet wheel and the intermediate wheel.
Figure 7:
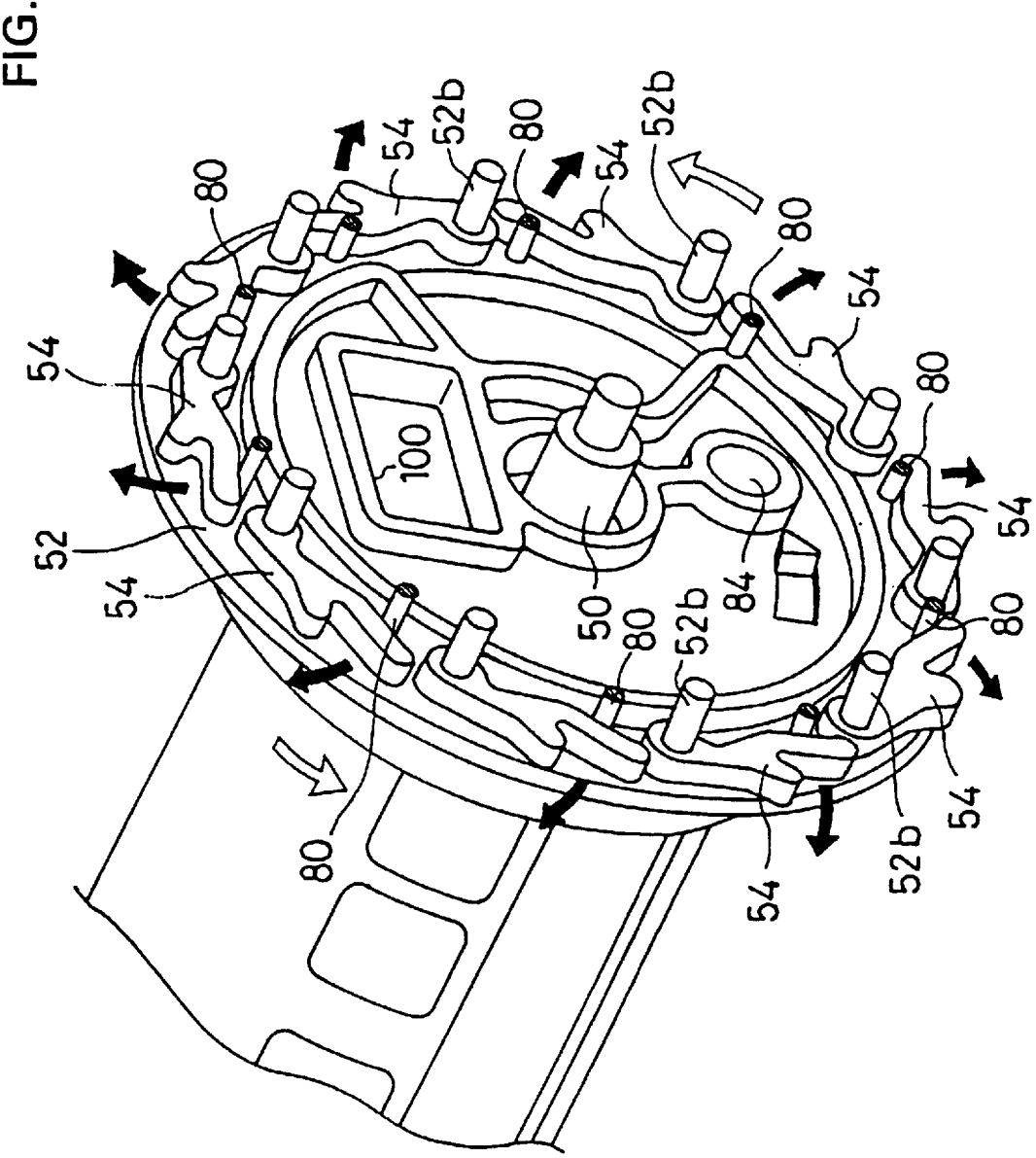
FIG. 7 is an enlarged perspective view of the reel provided with the ratchet wheel.

The intermediate wheel 56 has a projecting piece 98 standing at a right angle on the face confronting the reel 20 as shown in FIGS. 3, 4, and 6. The projecting piece 98 is inserted into the concave 96 through a window hole 100 of the ratchet wheel 52 such that the projecting piece 98 is inserted between the spring 94 and an internal wall 96a (FIG. 4) of the concave 96.

When the engagement between the pivotal trigger 60 and one of the internal teeth 76 of the lock ring 74 prevents rotation of the intermediate wheel 56, so as to cause rotational phase shift between the reel 20 and the ratchet wheel 52 with respect to the intermediate wheel 56, the spring 94 is compressed. As the force locking (preventing the rotation of) the intermediate wheel 56 is removed, the intermediate wheel 56 rotates in such a manner as to negate the rotational phase shift between the wheels 52 and 56 due to the biasing force of the spring 94.

Figure 11:
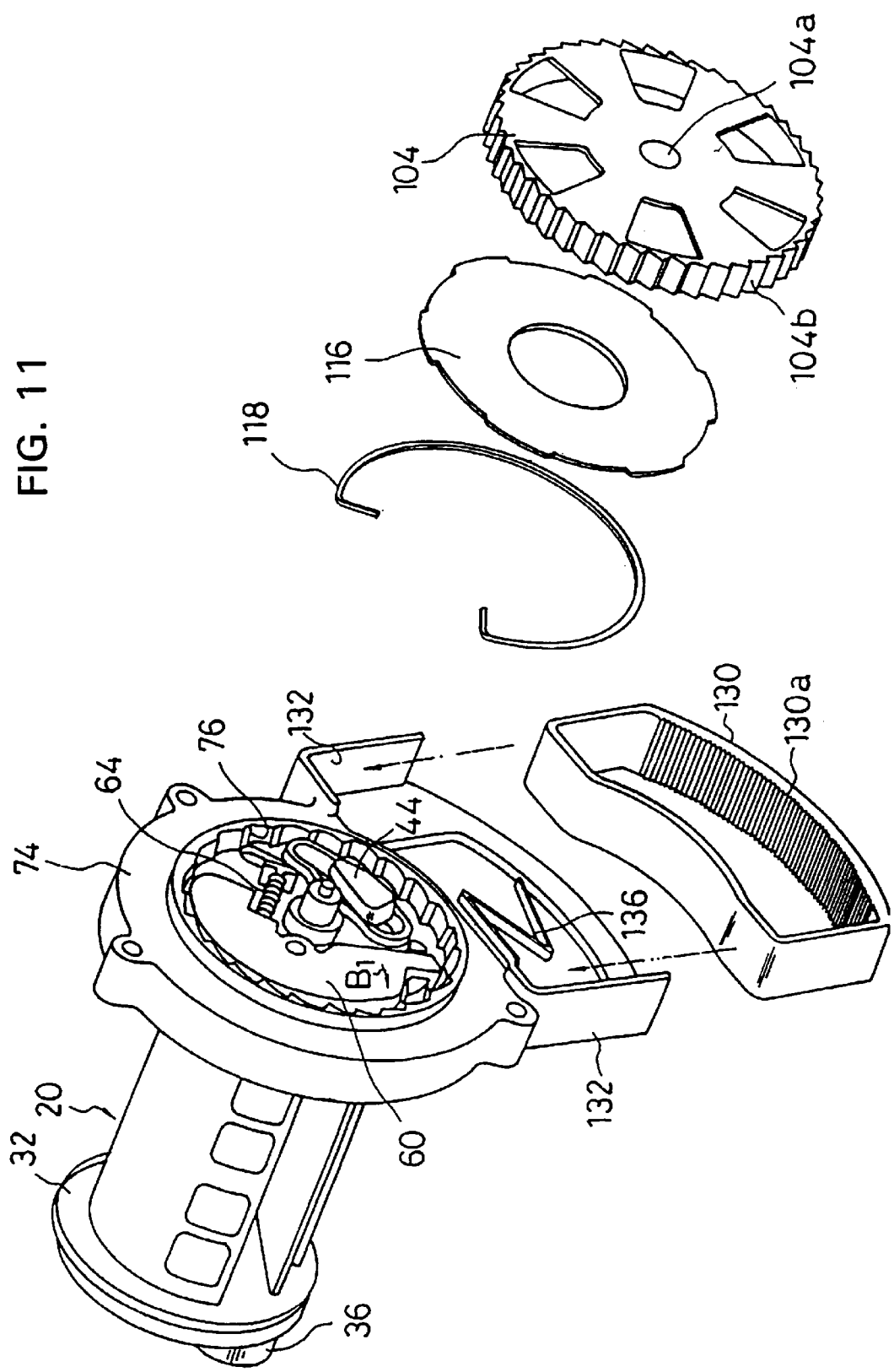
FIG. 11 is an exploded perspective view showing the relations among a gear wheel, a clutch wheel, and a stopper and a locking mechanism.
Figure 12:
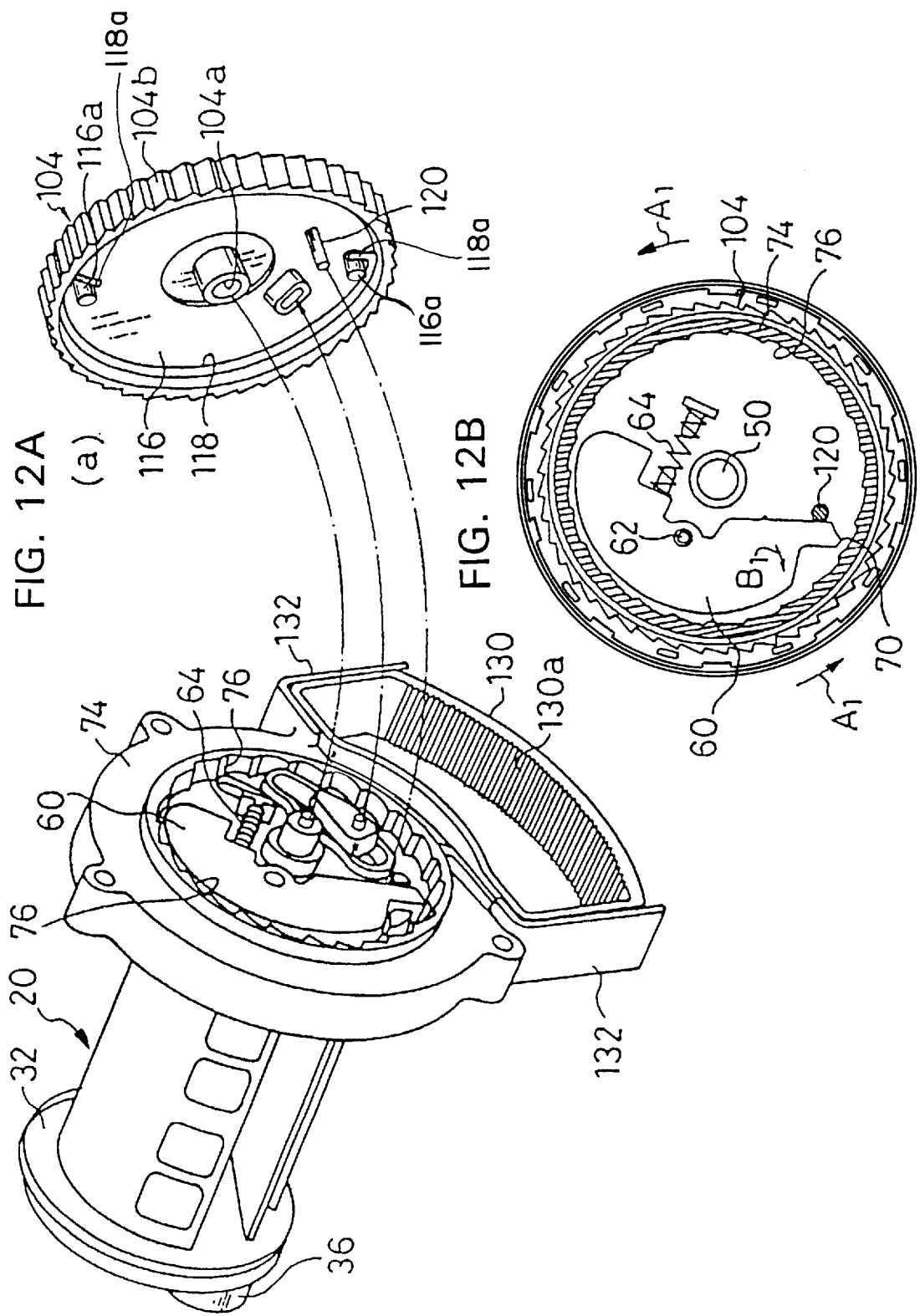
FIG. 12A is an exploded perspective view showing the relation among the gear wheel, the clutch wheel, and the locking mechanism.
FIG. 12B is a front view of the intermediate wheel showing the relation between a pivotal trigger and a starting pin 220.
Figure 13:
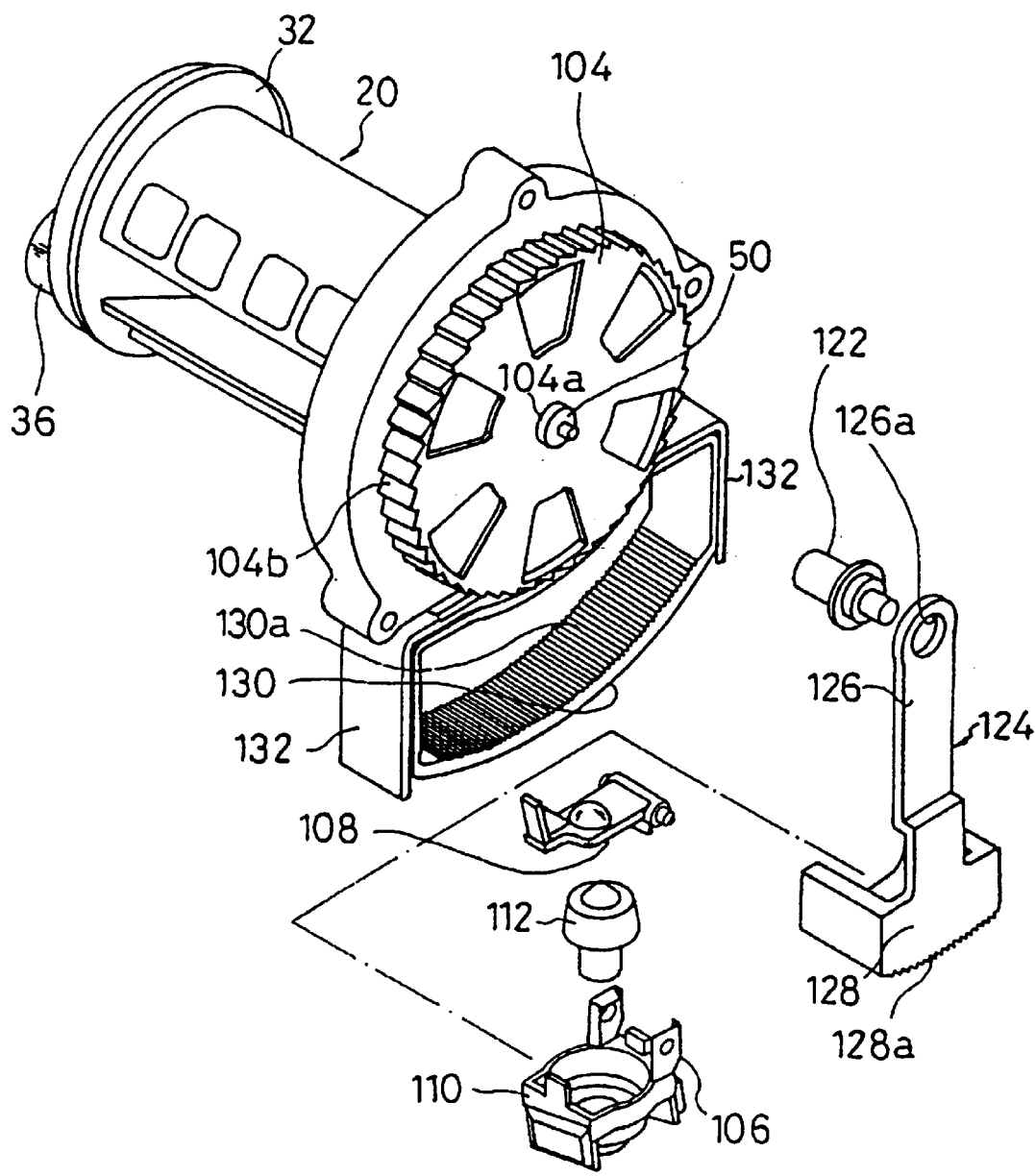
FIG. 13 is an exploded perspective view showing the relation between the acceleration sensor and the locking mechanism.

The shaft 50 is inserted into the central hole 56a of the intermediate wheel 56, and the distal end of the shaft 50 is rotatably engaged with a central hole 104a of the gear wheel 104 (shown in FIGS. 11 through 13).

The gear wheel 104 is provided with teeth 104b around the outer periphery thereof. One of the teeth 104b can be engaged by a lever 108 of an acceleration sensor 106.

As shown in FIG. 13, the sensor 106 comprises a casing 110 and a mass 112 loosely supported in the casing 110 in such a manner as to tilt. The mass 112 contacts the lower face in the longitudinal middle of the lever 108. The lever 108 is pivotally supported by the casing 110. When the mass 112 tilts, the tip of the lever 108 is pushed up to engage one of the teeth 104b. The engagement between the tip of the lever 108 and the teeth 104b prevents rotation of the gear wheel 104.

As shown in FIGS. 11 and 12, a clutch wheel 116 is disposed inside the gear wheel 104. The clutch wheel 116 is fitted with a C-shape spring 118 bent in an arc shape and disposed in such a manner as to extend along the outer periphery of the clutch wheel 116. The spring 118 is bent at both ends 118a in the radial direction. Both ends 118a are engaged to projections 116a disposed on the face at the reel 20 side of the clutch wheel 116.

The arc-like portion of the C-like spring 118 is positioned at the periphery of the clutch wheel 116 so as to elastically contact the inner periphery of the gear wheel 104.

When rotation of the gear wheel 104 is not prevented by the lever 108, the clutch wheel 116 rotates integrally with the gear wheel 104 due to the frictional force of the spring 118. When rotation of the gear wheel 104 is prevented by lever 108, the clutch wheel 116 is subjected to the same frictional force from the gear wheel 104 but allowed to rotate.

As shown in FIG. 12, the clutch wheel 116 is provided with a starting pin 120 disposed perpendicularly on the face confronting the intermediate wheel 56. The starting pin 120 contacts a side face of the trigger 60 near the tooth portion 70, as shown in FIG. 12B.

As shown in FIG. 13, a bush 122 mounted on the tip of the shaft 50 pivotally supports a sensor holder 124.

The sensor holder 124 comprises an elongated, plate-like arm portion 126 having a supporting hole 126a at an upper end which is fitted on the bush 122, and a sensor holding portion 128 integrally disposed on a lower end of the arm portion 126. The sensor holding portion 128 has a bottom (outer surface) which is curved in a convex arc shape and provided with a male rack 128a.

The lock ring 74 guides a stopper 130 which is allowed to move in the radial direction for positioning the sensor. That is, the lock ring 74 has a pair of side walls 132 extending from the bottom of the ring-like portion the lock ring 74. The rectangular frame-like stopper 130 is slidably disposed between the side walls 132 and 132. The stopper 130 has a bottom (inner surface) which is concaved in an arc shape and provided with a female rack 130a capable of engaging the male rack 128a.

The upper surface (outer surface) of the stopper 130 has a concave arc shape. The upper surface of the stopper 130 faces the ratchet wheel 52 and the ratchets 54. The stopper 130 is biased toward the ratchet wheel 52 by a spring 136.

The stopper 130 is biased as mentioned above so that the upper surface of the stopper 130 slides against the ratchet wheel 52 and the ratchets 54. To minimize the friction produced by the sliding, the stopper 130 has a solid lubricant layer (not shown) formed on the upper surface.

It should be noted that a cover case 134 (FIG. 1) is mounted on the side wall 14 of the frame 10 to cover the entire locking mechanism 22.

The description of the operation of the seat belt retractor as structured above is as follows.

In a normal state of a vehicle (for example, when the vehicle is stopping or driving at a fixed speed), the mass 112 of the acceleration sensor 106 is vertically oriented and the tip of the lever 108 is spaced apart from the teeth 104b of the gear wheel 104. When the seat belt 18 is withdrawn, the reel 20 and the shaft 50 freely rotate with the ratchet wheel 52, the intermediate wheel 56, the gear wheel 104, and the clutch wheel 116 so that the seat belt is smoothly withdrawn.

When the seat belt 18 is released or a buckle is released, the seat belt 18 is smoothly wound onto the reel 20 by the return spring 24.

Figure 14:
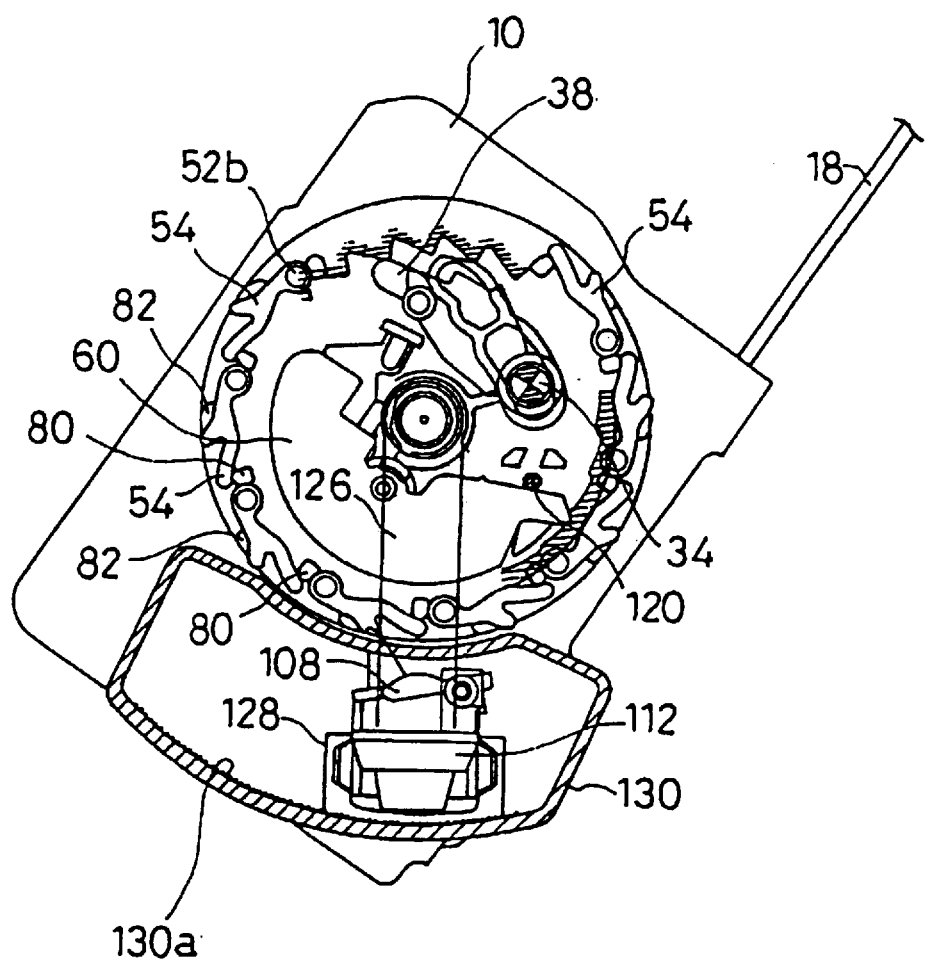
FIG. 14 is an explanation view of the operation when racks 128a, 130a engage with each other.

The ratchets 54 are positioned inward as shown in FIG. 14 and the female rack 130*a* of the stopper 130 is engaged with the male rack 128*a* of the sensor holding portion 128 by the spring 136.

When the vehicle is subjected to large acceleration or deceleration by a collision or the like, the locking mechanism 22 is activated to prevent the withdrawal of the seat belt 18. A large acceleration exerted on the locking mechanism 22 causes the mass 112 to tilt. Thus, the distal end of the lever 108 is pushed up and engages one of the teeth 104*b* of the gear wheel 104, thereby preventing rotation of the gear wheel 104 (FIG. 16A through FIG. 18C).

During a collision, an occupant's body tends to move forward toward the front of the vehicle pulling on the seat belt 18 so that the reel 20 rotates in the belt withdrawing direction ($A_1$). Since the reel 20 and the ratchet wheel 52 must integrally rotate, and the intermediate wheel 56 is pressed by the spring 94, the wheels 52 and 56 rotate whenever the reel 20 rotates. The trigger 60 disposed on the intermediate wheel 56 also rotates integrally with the intermediate wheel 56.

The clutch wheel 116 contacts the inner periphery of the gear wheel 104 due to the C-like spring 118, and slides with friction on the inner periphery of the gear wheel 104. Since the starting pin 120 projecting from the face of the clutch wheel 116 contacts the side face of the trigger 60 near the tooth portion 70, the trigger 60 on the intermediate wheel 56 is subjected to a reaction force in the opposite direction by the starting pin 120 when the intermediate wheel 56 rotates. The biasing force of the spring 64 against the trigger 60 is smaller than the force produced by the sliding friction between the clutch wheel 116 (the C-like spring 118) and the gear wheel 104. Therefore, the trigger 60 is pressed by the starting pin 120 to rotate about the supporting shaft 62 in the direction of B1 shown in FIGS. 10 through 12 and 17 through 19. The tooth portion 70 of the trigger 60 engages one of the internal teeth 76 of the lock ring 74 to stop rotation of the intermediate wheel 56.

Even after rotation of the intermediate wheel 56 is stopped, the reel 20 and the ratchet wheel 52 continue to rotate. The guide pin 42 of the right pawl 38 moves within the elongated hole 90 whereby the right pawl 38 rotates in the direction $P_1$ (FIG. 4) and the teeth 38*a* of the right pawl 38 engage the teeth 28*a* of the hole 28 in the frame 10. In addition, the pawl pin 34 moves within the elongated hole 86 and the arm guide pin 46 moves within the elongated hole 88 so that the pawl pin 34 rotates in the direction $P_1$ (FIGS. 2 and 3) and the left pawl 36 also rotates in the direction $P_1$ such that the teeth 36*a* of the left pawl 36 engage the teeth 26*a* of the hole 26 in the frame 10.

Therefore, the reel 20 is locked stopping the withdrawal of the seat belt 18, thus protecting the occupant.

Figure 15:
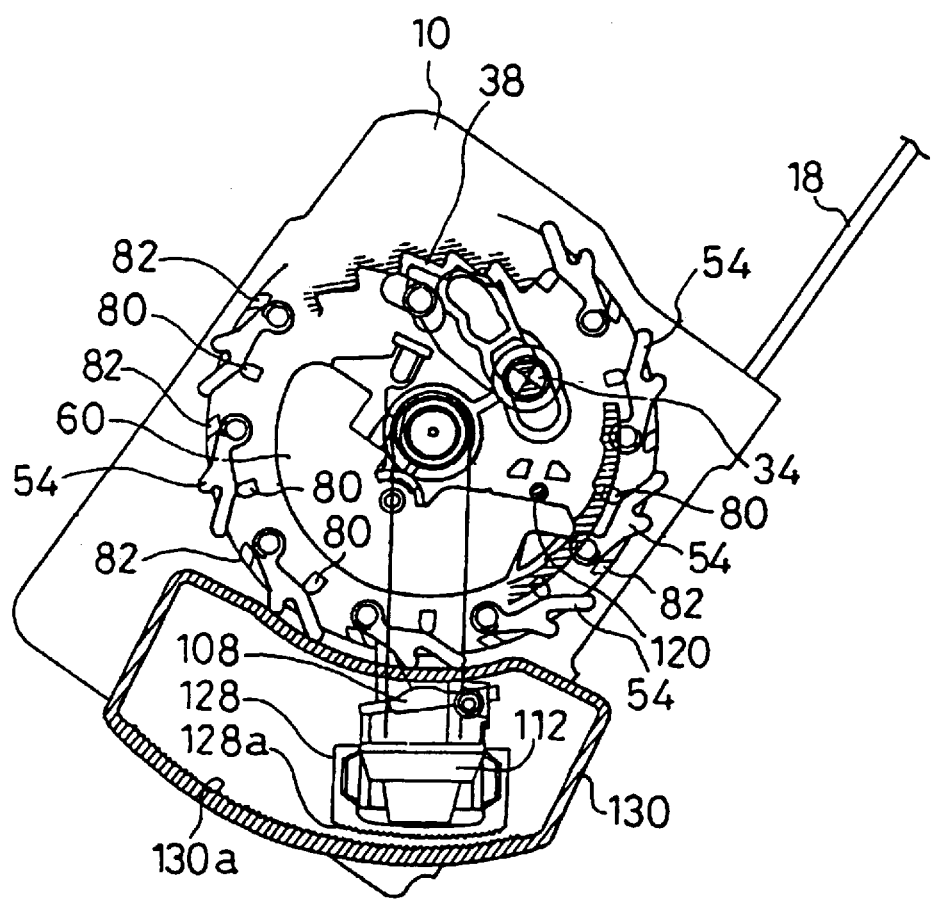
FIG. 15 is an explanation view of the operation when the racks 128a, 130a move away from each other.
Figure 16A:
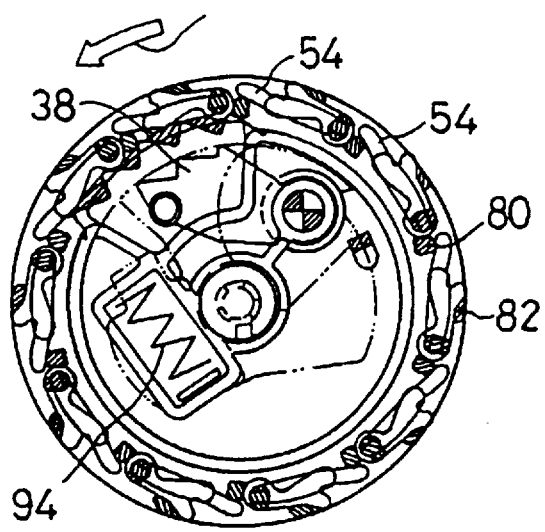
Figure 16B:
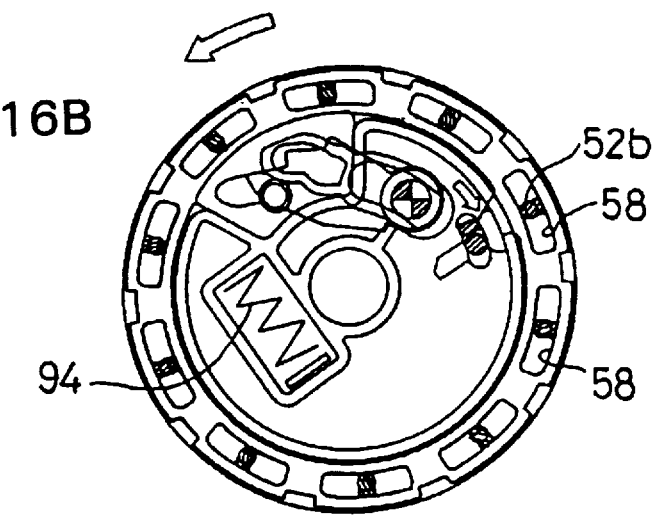
Figure 16C:
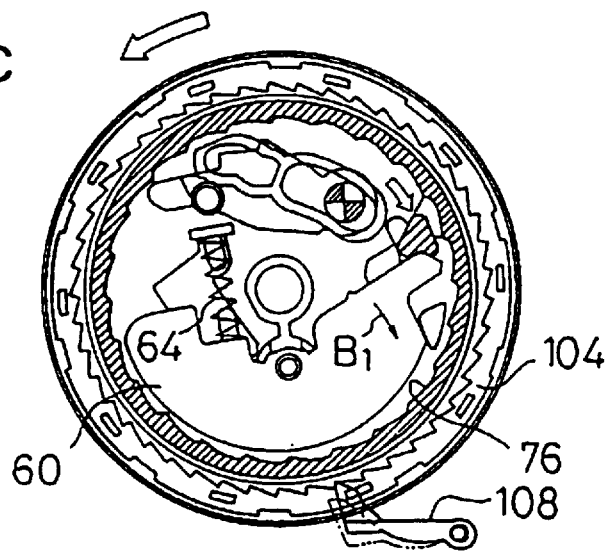
Figure 17A:
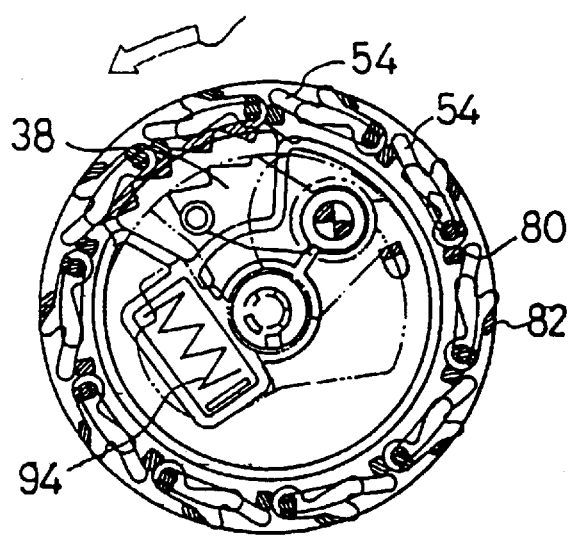
Figure 17B:
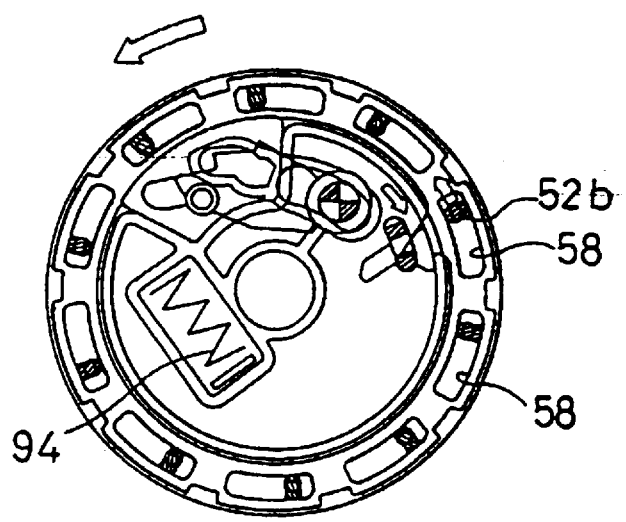
Figure 17C:
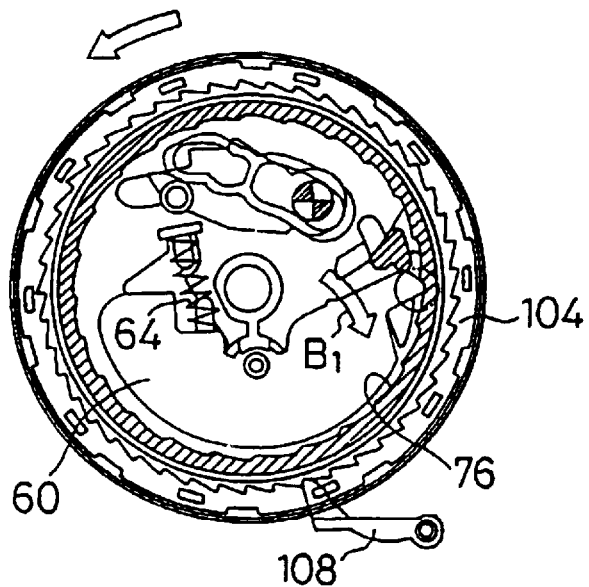
Figure 18A:
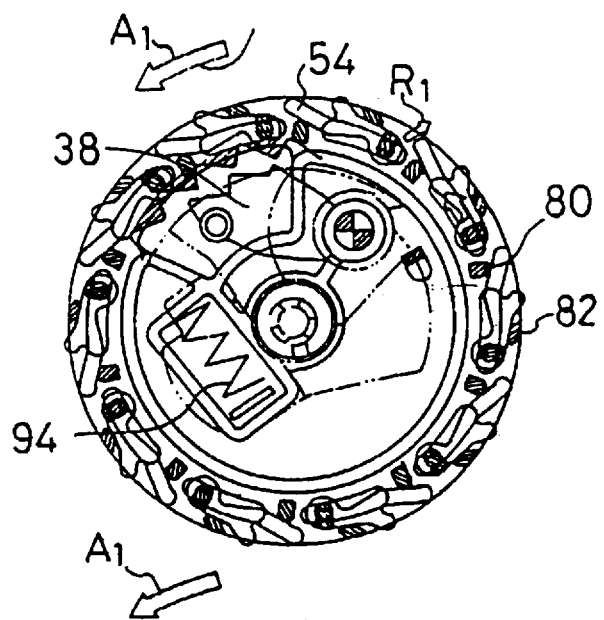
Figure 18B:
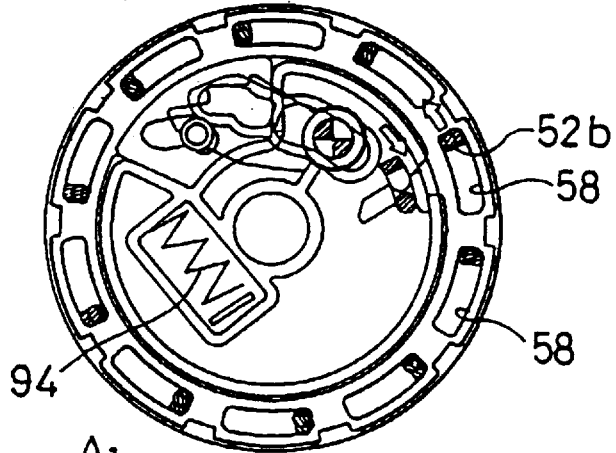
Figure 18C:
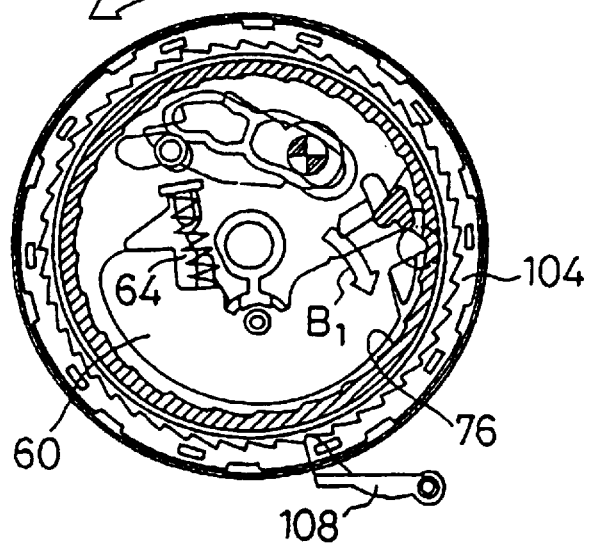
Figure 19A:
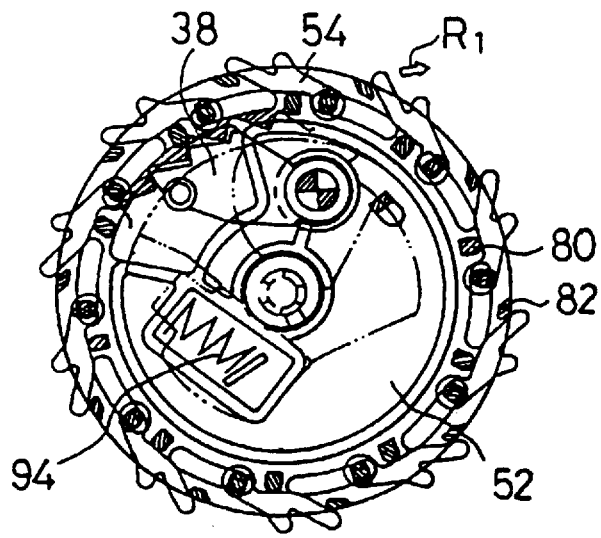
Figure 19B:
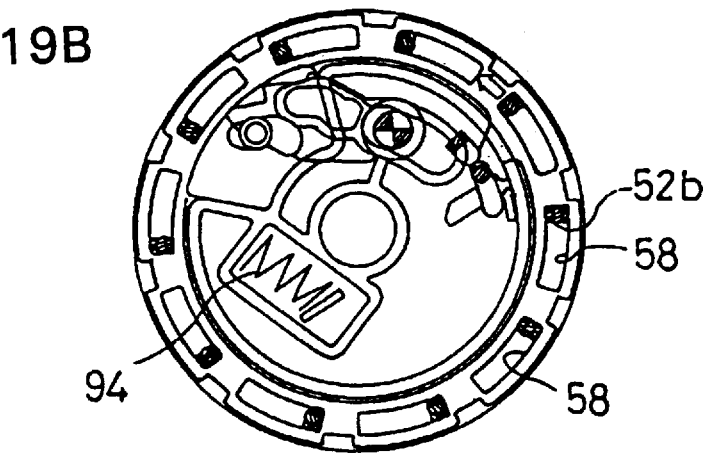
Figure 19C:
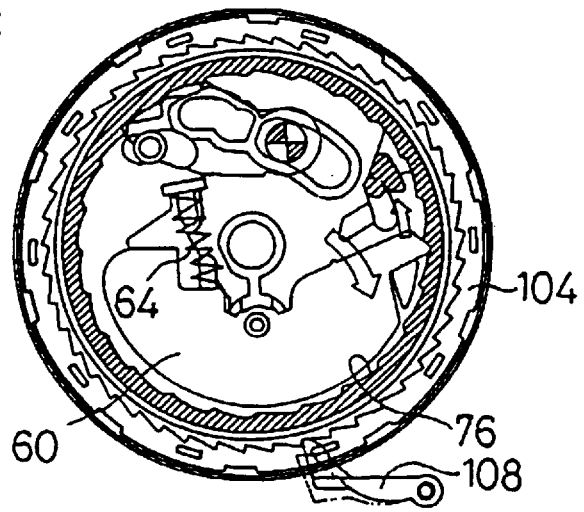

When the intermediate wheel 56 is stopped from rotating by the trigger 60 and the ratchet wheel 52 still rotates, the ratchets 54 pivot outward as shown in FIG. 8 and FIG. 19. The inward face of each ratchet 54 contacts a ratchet guide pin 80, pivoting ratchets 54 outward in the direction R1 upon rotation of the ratchet wheel 52. The stopper 130 disposed below the outer periphery of the ratchet wheel 52 is pressed down by the ratchets 54 as shown in FIG. 15, whereby the female rack 130*a* of the stopper 130 separates from the male rack 128*a* of the sensor holder 124.

When the seat belt 18 is rapidly withdrawn, rotation of the clutch wheel 116 and the gear wheel 104 is delayed with respect to the reel 20 because of inertia. The starting pin 120 presses the trigger 60 in the direction B1 so that the tooth portion 70 of the trigger 60 engages the internal teeth 76 of the lock ring 74. As a result, the pawls 36 and 38 engage the teeth 26*a* and 38*a*, respectively, to stop the withdrawal of the seat belt 18.

Figure 20A:
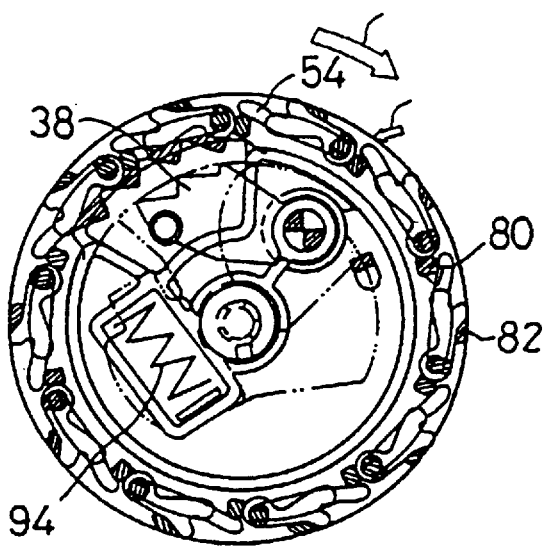
Figure 20B:
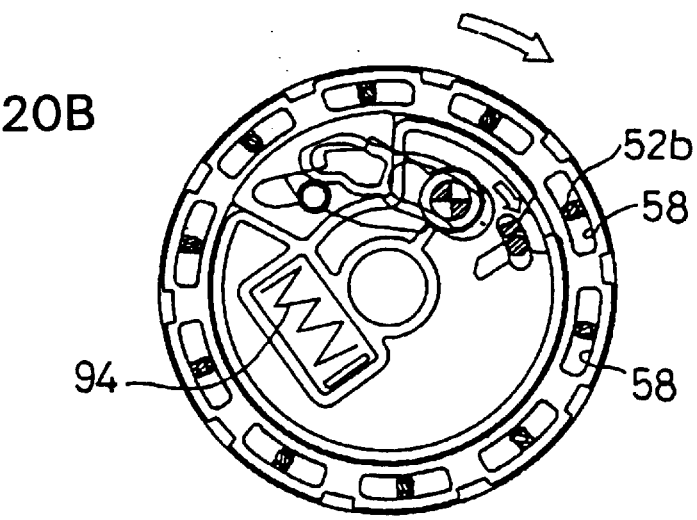
Figure 20C:
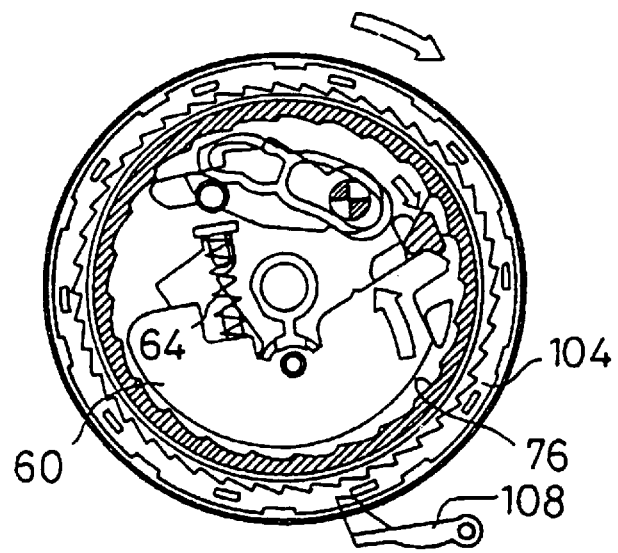
Figure 21:
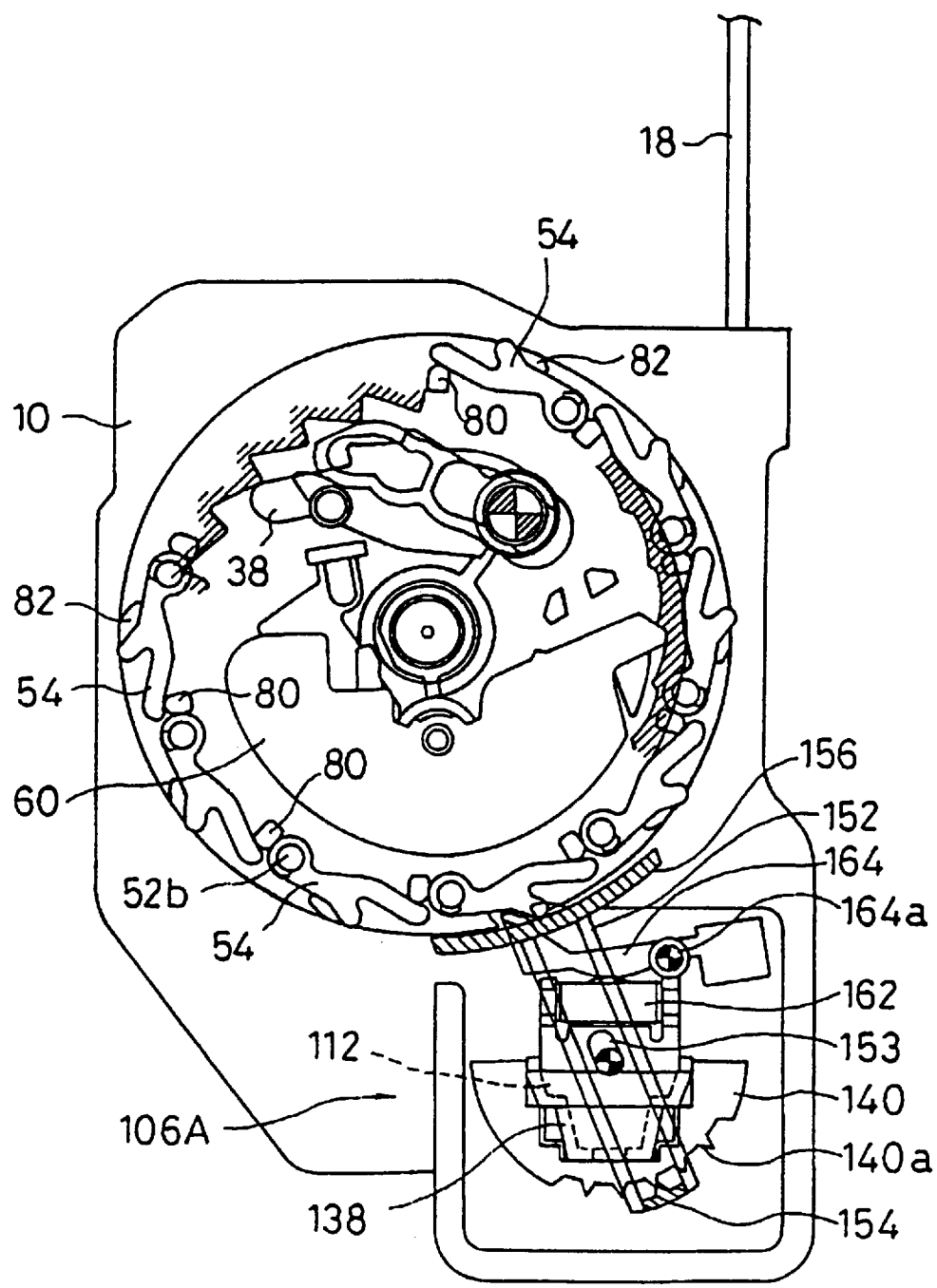
FIG. 21 is a side view of a seat belt retractor according to another embodiment.

When the force withdrawing the seat belt 18 is canceled, the rotational phase shift between the ratchet wheel 52 and the intermediate wheel 56 is canceled by the spring 94 as shown in FIG. 20. The ratchets 54 return inwardly, the stopper 130 is pressed upward by the spring 136, and the racks 130*a* and 128*a* engage each other.

When the angle of the seat back of the vehicle seat is changed, the seat belt retractor with the sensor holder 124 is tilted. As a result, the mass 112 of the acceleration sensor 106 tilts with respect to the sensor holder 124 so that the tip of the lever 108 engages the teeth 104*b* of the gear wheel 104. Therefore, when the seat belt 18 is first attempted to be withdrawn after changing the angle of the seat back, the reel 20 is prevented from rotating by the operation of the locking mechanism 22, and the seat belt 18 cannot be withdrawn.

Since the stopper 130 is pressed down by the ratchets 54, the female rack 130*a* of the stopper 130 and the male rack 128*a* of the sensor holder 124 are separated from each other. The top inner surface of the stopper 130 comes into contact with the lever 108 so that the lever 108 is pushed down by the top inner surface, whereby the teeth 104*b* of the gear wheel 104 move apart from the tip of the lever 108. The sensor holder 124 pivots on the bush 102 such that the arm portion 126 is vertically oriented.

Therefore, by loosening the seat belt 18 after that, the rotational phase shift between the ratchet wheel 52 and the intermediate wheel 56 is canceled by the spring 94 so that the ratchets 54 pivot inward, the stopper 130 is pressed upward by the spring 136, and the racks 128*a* and 130*a* re-engage each other again. Since cancellation of the rotational phase shift between the ratchet wheel 52 and the intermediate wheel 56 returns the right pawl 38 and the left pawl 36 to their normal positions, the seat belt 18 can be smoothly withdrawn after that.

Since the sensor holder 124 is stopped relative to the stopper 130 by the engagement between the racks 128*a* and 130*a*, the sensor holder 124 cannot move even when a large acceleration is exerted on the sensor holder 124. Therefore, no noise is created.

FIG. 21 through FIG. 24 show another embodiment. In this embodiment, the structure of the acceleration sensor 106A is different from the structure of the acceleration sensor 106.

Similar to the acceleration sensor 106, a mass 112 is supported by a casing 138. The acceleration sensor 106A comprises a dead mass 140 disposed on the lower surface of the casing 138 for vertically orienting the casing 138. The casing 138 is pivotally supported on a housing 142. The housing 142 has an L-shaped bracket 144 so that the casing 138 is disposed between a body 146 of the housing 142 and the bracket 144 of the housing 142. Projections 150, 148 from the casing 138 are supported on the body 146 and the bracket 144, respectively.

The projection 150 penetrates an intermediate hole 153 of a stopper 152. The stopper 152 is vertically oriented and has a protrusion 154 at the lower end. The protrusion 154 is disposed below the dead mass 140 when assembled, and is capable of engaging a rack 140*a* formed on the arc-like bottom of the dead mass 140.

The stopper 152 is integrally provided with an arc-like guide plate 156 at the upper end. The guide plate 156 has a concave upper surface which faces the aforementioned ratchet wheel 52 and ratchets 54. The stopper 152 is biased upward by a spring 160 so that the guide plate 156 slides on the outer periphery of the ratchet wheel 52.

Levers 162 and 164 are disposed above the mass 112. The lever 162 is supported by the casing 138 through shafts 162*a*, 162*b*, and the lever 164 is supported by the housing 142 through shafts 164*a*, 164*b*. The tip of the lever 164 is capable of engaging one of the teeth 104*b* of the gear wheel 104.

When the mass 112 tilts, the tip of the lever 164 engages the teeth 104*b* of the gear wheel 104 so as to lock the reel 20.

When the angle of the seat back is changed, the mass 112 also tilts, and the tip of the lever 164 engages the teeth 104*b* of the gear wheel 104 so as to lock the reel 20. When the seat belt 18 is first withdrawn, the guide plate 156 is pressed down by the ratchets 54 so that the protrusion 154 moves apart from the rack 140*a*. Then, the casing 138 is returned to the vertical orientation by pivotal movement caused by the dead mass 140. When the tension exerted on the seat belt 18 is canceled, after that, the reel 20 can again freely rotate.

In the embodiment of FIG. 21 through FIG. 24, since the protrusion 154 normally engages the rack 140*a* due to the spring 160, the casing 138 and the related members do not rock so that no noise is created.

Figure 22A:
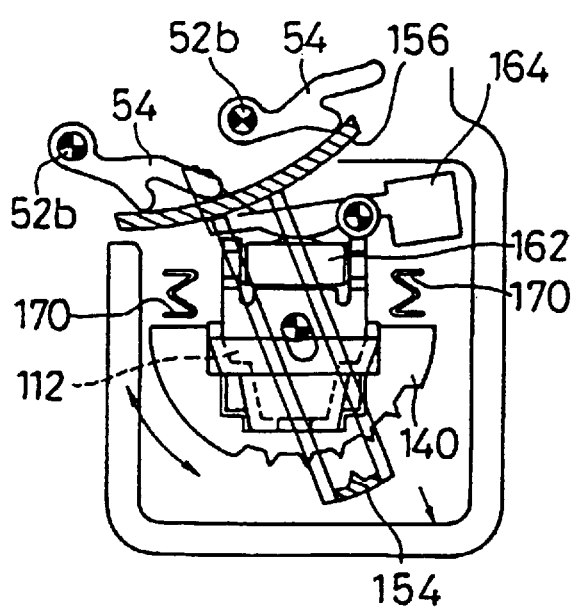
Figure 22B:
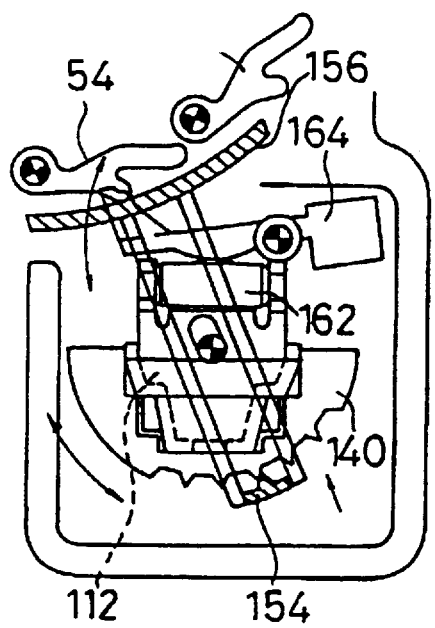
Figure 22C:
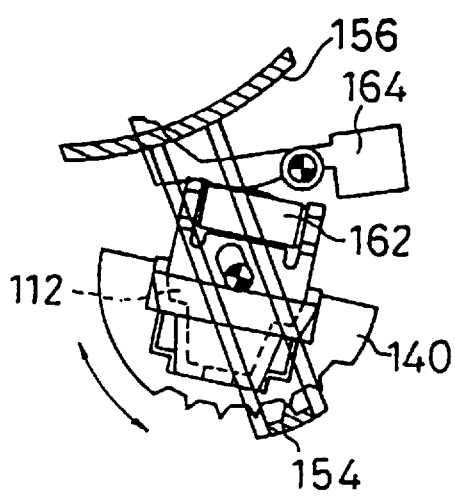
Figure 22D:
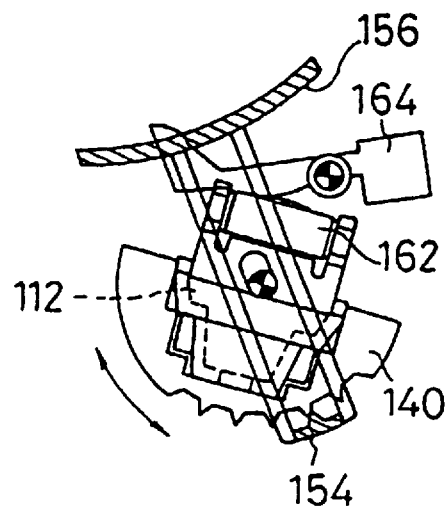
Figure 23:
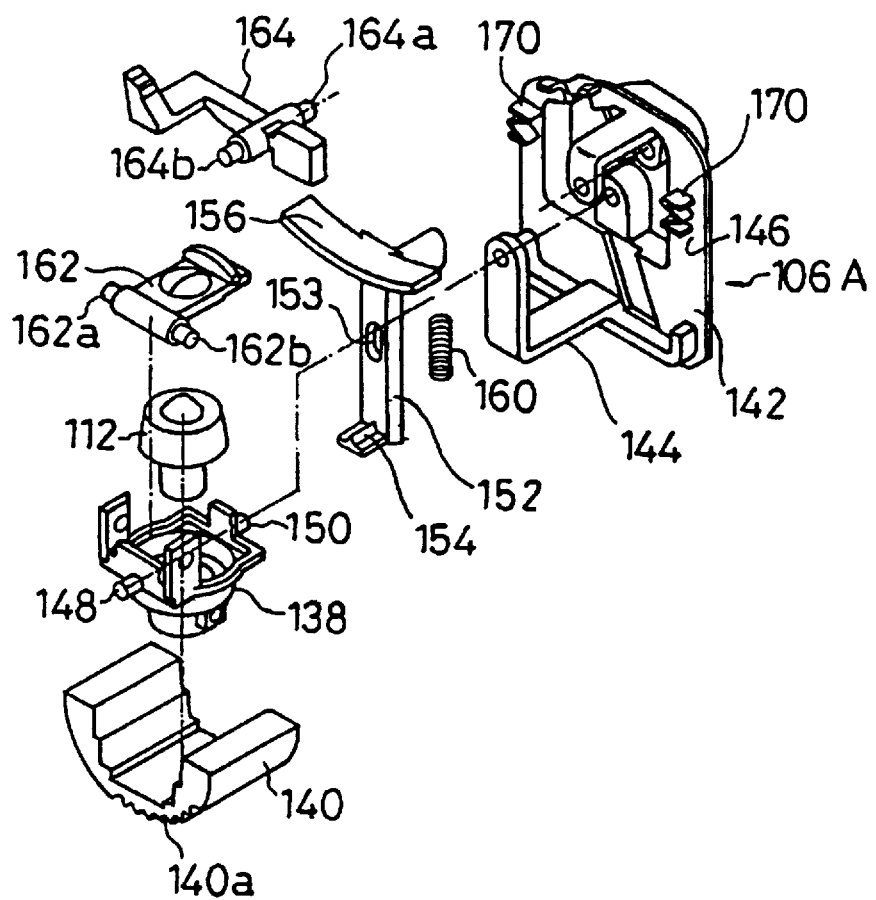
FIG. 23 is an exploded perspective view of an acceleration sensor 106A.
Figure 24:
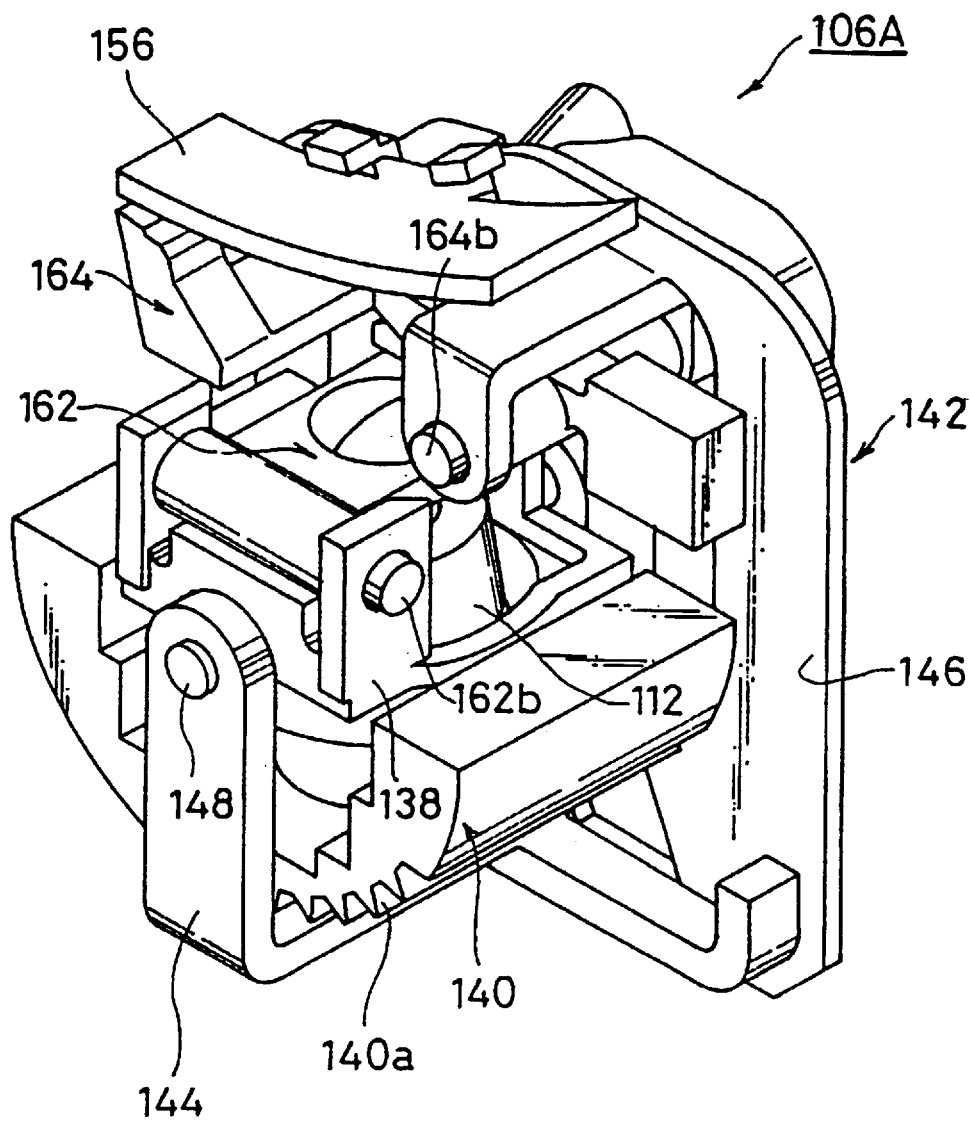
FIG. 24 is a perspective view of the acceleration sensor 106A.
Figure 25:
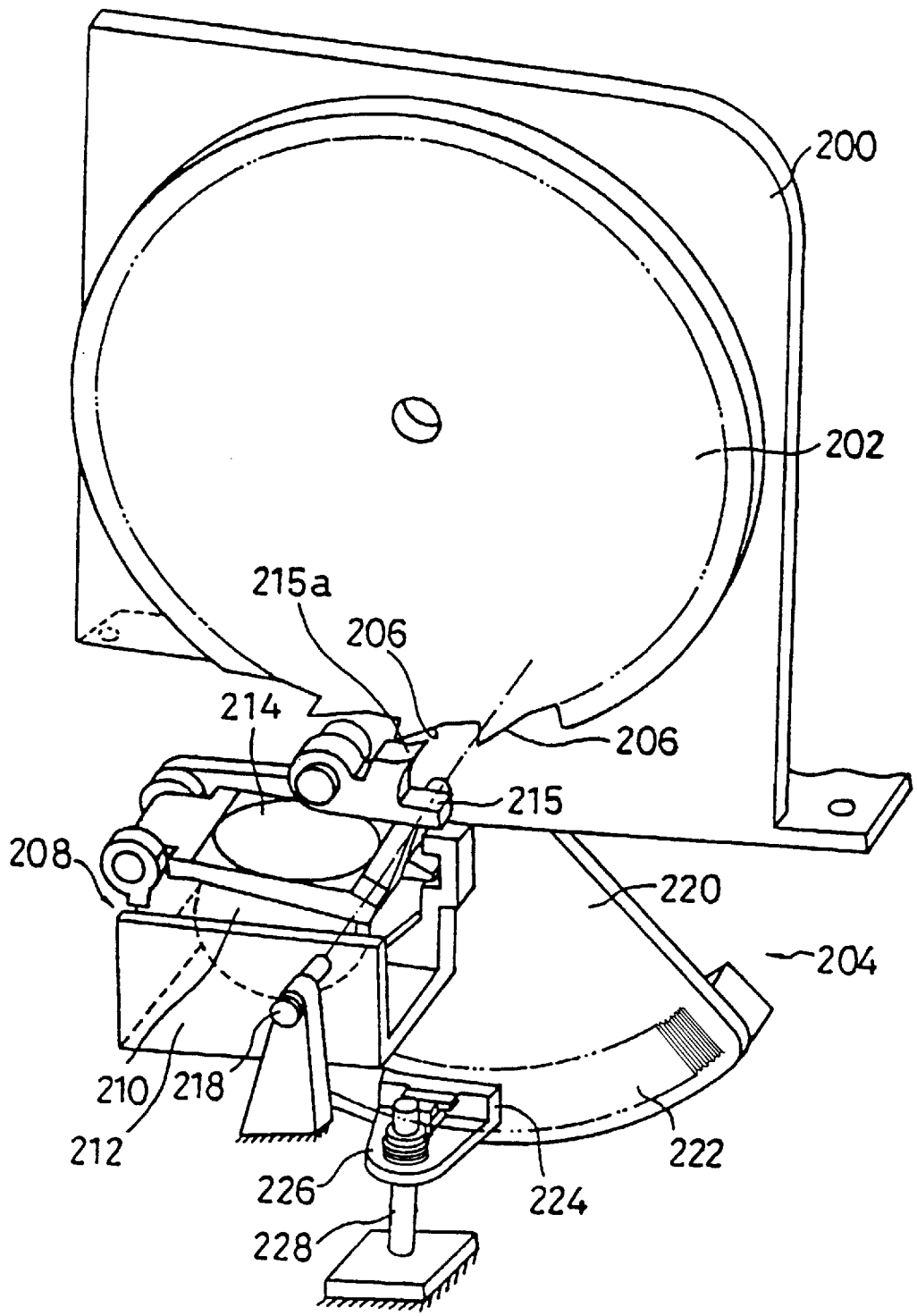
FIG. 25 is a perspective view showing a conventional seat belt retractor.

In FIG. 22A and FIG. 23, the numeral 170 designates springs for absorbing the impact of the dead mass 140 and for preventing the impact noise.

Alternatively, rather than the pawls 36, 38 engaging the teeth 26*a*, 28*a* on the frame 10, the pawls may be mounted on the frame 10 and the reel 20 may have a wheel including teeth which engage the pawls.

According to the seat belt retractor of the present invention, the acceleration sensor returns to the vertical oriented position regardless of how the angle of the seat back is changed. In addition, the rocking members of the acceleration sensor are fixed not to rock in the normal state so that no noise is created, even with the vibration of the vehicle during driving.

What is claimed is:

1. A reel lock actuator for controlling an unwinding lock on a reel, wherein activating the unwinding lock stops rotation of the reel on its axis, said reel lock actuator comprising:

a tilting mass having a center of gravity and reacting to changes in transverse acceleration and roll relative to the reel axis;

a casing supporting said tilting mass, said casing being pivotable about a first axis; and a pivot stop engaging said casing to prevent said casing from pivoting about said first axis, wherein said pivot stop is released when activating the unwinding lock.

2. A reel lock actuator as claimed in claim 1, wherein the pivot stop comprises:

a first engaging member;

a second engaging member connected to said casing and confronting said first engaging member; and an engagement release for separating said first engaging member from contact with said second engaging member when activating the unwinding lock.

3. A reel lock actuator as claimed in claim 2, wherein said engagement release comprises:

a variable diameter wheel rotatable on the reel axis; and a facing member radially confronting said variable diameter wheel, said facing member being connected to said first engaging member;

wherein said facing member is radially displaced with respect to the reel axis when said variable diameter wheel changes diameter, thereby separating said first engaging member from contact with said second engaging member.

4. A reel lock actuator as claimed in claim 3, wherein a resilient member biases said facing member toward the reel axis.

5. A reel lock actuator as claimed in claim 3, wherein said variable diameter wheel comprises:

a ratchet wheel rotating integrally with the reel; and a plurality of ratchets distributed on said ratchet wheel around the reel axis, each one of said plurality of ratchets being radially adjustable with respect to the reel axis;

wherein radial adjustment of said plurality of ratchets causes radial displacement of said facing member with respect to the reel axis.

6. A reel lock actuator as claimed in claim 5, wherein each one of said plurality of ratchets is pivotally supported on a respective pivot shaft projecting parallel to the reel axis.

7. A reel lock actuator as claimed in claim 6, wherein said plurality of ratchets pivotally extend radially outward beyond an outer periphery of the ratchet wheel.

8. A reel lock actuator as claimed in claim 5, wherein said facing member comprises an arcuate plate confronting at least one of said plurality of ratchets.

9. A seat belt retractor as claimed in claim 2, wherein said first engaging member comprises:

a concave arcuate surface; and wherein said second engaging member comprises a convex arcuate surface extending along a part of a circle centered on the reel axis.

10. A reel lock actuator as claimed in claim 9, wherein a non-slip surface covers at least one of said concave arcuate surface and said convex arcuate surface.

11. A reel lock actuator as claim in claim 9, wherein mating surfaces cover said concave arcuate surface and said convex arcuate surface.

12. A reel lock actuator as claimed in claim 2, wherein said first axis is coincident with the reel axis.

13. A reel lock actuator as claimed in claim 12, further comprising a pivotal arm holding said casing at a fixed radial distance from the reel axis, wherein said arm pivots on the reel axis to vertically align said tilting mass center of gravity and the reel axis when said engagement release separates said first engaging member from said second engaging member.

14. A reel lock actuator as claimed in claim 2, wherein said first axis is parallel and spaced from the reel axis.

15. A reel lock actuator as claimed in claim 14, further comprising a dead mass, wherein said dead mass causes said casing to pivot on said first axis to vertically align said tilting mass center of gravity and said first axis when said engagement release separates said first engaging member from said second engaging member.

16. A reel lock actuator as claimed in claim 5, further comprising an intermediate wheel rotatable on the reel axis, said intermediate wheel rotating integrally with said variable diameter wheel when transverse acceleration and roll relative to the reel axis are unchanging, and said intermediate wheel rotating relative to said variable diameter wheel when said tilting mass reacts to changes in transverse acceleration and roll relative to the reel axis;

wherein said intermediate wheel includes a plurality of ratchet guide pins distributed around the reel axis and projecting axially toward said variable diameter wheel, each of said plurality of ratchet guide pins contiguously engaging a respective one of said plurality of ratchets;

wherein the unwinding lock is activated when said tilting mass center of gravity is shifted reacting to changes in transverse acceleration and roll relative to the reel axis, said intermediate wheel is stopped from rotating on the reel axis, and said plurality of ratchet guide pins radially adjust said plurality of ratchets with respect to the reel axis.

* * * * *